(12) United States Patent
Kouno et al.

(10) Patent No.: US 9,372,063 B2
(45) Date of Patent: Jun. 21, 2016

(54) POSITION SENSING DEVICE HAVING MAGNETIX FLUX TRANSMISSION UNITS

(71) Applicant: DENSO CORPORATION, Kariya, Aichi-pref. (JP)

(72) Inventors: Naoaki Kouno, Chiryu (JP); Tetsuji Yamanaka, Obu (JP); Yoshiyuki Kono, Obu (JP)

(73) Assignee: DENSO CORPORATION, Kariya (JP)

(*) Notice: Subject to any disclaimer, the term of this patent is extended or adjusted under 35 U.S.C. 154(b) by 77 days.

(21) Appl. No.: 14/291,289

(22) Filed: May 30, 2014

(65) Prior Publication Data
US 2014/0354268 A1    Dec. 4, 2014

(30) Foreign Application Priority Data

Jun. 4, 2013   (JP) .................................. 2013-117628
Mar. 20, 2014  (JP) .................................. 2014-57434

(51) Int. Cl.
*G01B 7/30*   (2006.01)
*G01B 7/14*   (2006.01)
*G01D 5/14*   (2006.01)

(52) U.S. Cl.
CPC . *G01B 7/14* (2013.01); *G01D 5/147* (2013.01)

(58) Field of Classification Search
CPC ............. G01B 7/14; G01B 7/30; G01D 5/147
USPC ......................................... 324/207.2–207.25
See application file for complete search history.

(56) References Cited

U.S. PATENT DOCUMENTS

| 4,810,965 A | 3/1989 | Fujiwara et al. |
| 7,391,208 B2 * | 6/2008 | Wolf ...................... G01D 5/147 324/207.2 |
| 2002/0118011 A1 | 8/2002 | Wolf |
| 2012/0126796 A1 | 5/2012 | Drespling et al. |

FOREIGN PATENT DOCUMENTS

| JP | 8-292004 | 11/1996 |
| JP | 2007-187540 | 7/2007 |
| JP | 2008-267966 | 11/2008 |
| JP | 2013-21780 | 1/2013 |
| JP | 2013-500484 | * 1/2013 ............... G01D 5/14 |

OTHER PUBLICATIONS

Office Action (2 pages) dated May 7, 2015 issued in corresponding Japanese Application No. 2014-057434 and English translation (3 pages).

* cited by examiner

*Primary Examiner* — Jay Patidar
(74) *Attorney, Agent, or Firm* — Nixon & Vanderhye P.C.

(57) ABSTRACT

A position sensing device has a first magnetic flux transmission unit that includes first thin boards made of long shape magnetic material stacked along a board thickness direction and a second magnetic flux transmission unit that includes second thin boards made of long shape magnetic material stacked along the board thickness direction, for defining a gap space between the first and second magnetic flux transmission units when disposing the first and second magnetic flux transmission units on a rotating body. Further, the position sensing device includes first and second magnets disposed between both ends of the first and second magnetic flux transmission units. A Hall IC disposed on a mold part moves within the gap space along a gap space longitudinal direction relative to the rotating body for outputting a signal according to a density of a magnetic flux passing therethrough.

14 Claims, 22 Drawing Sheets

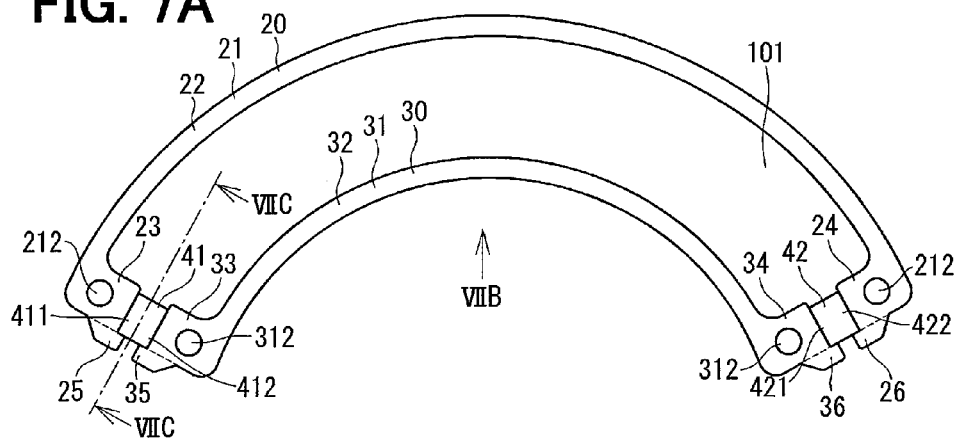
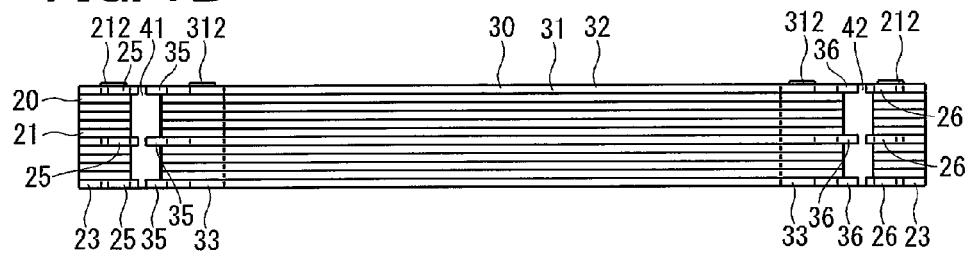
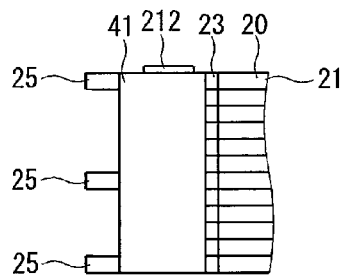
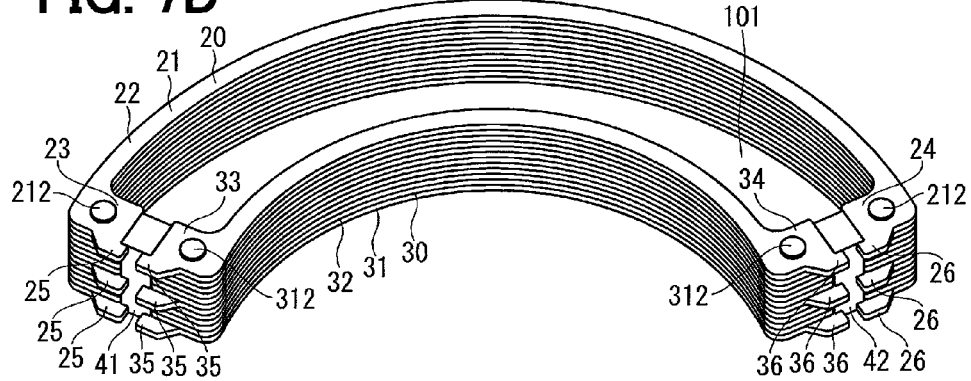

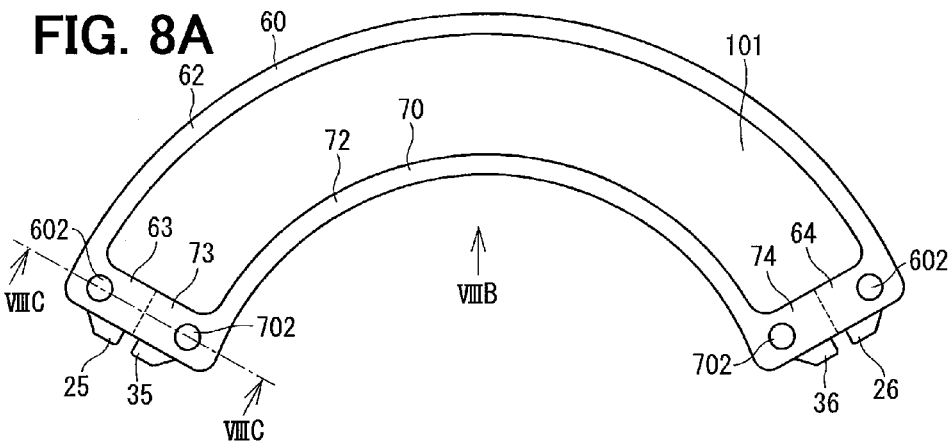
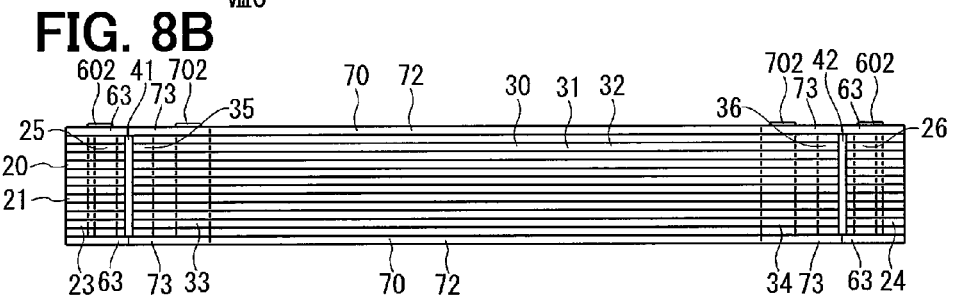
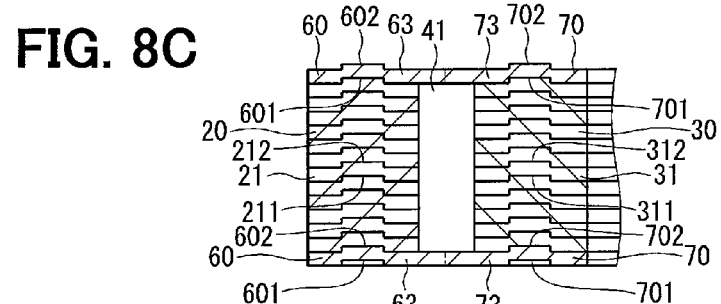
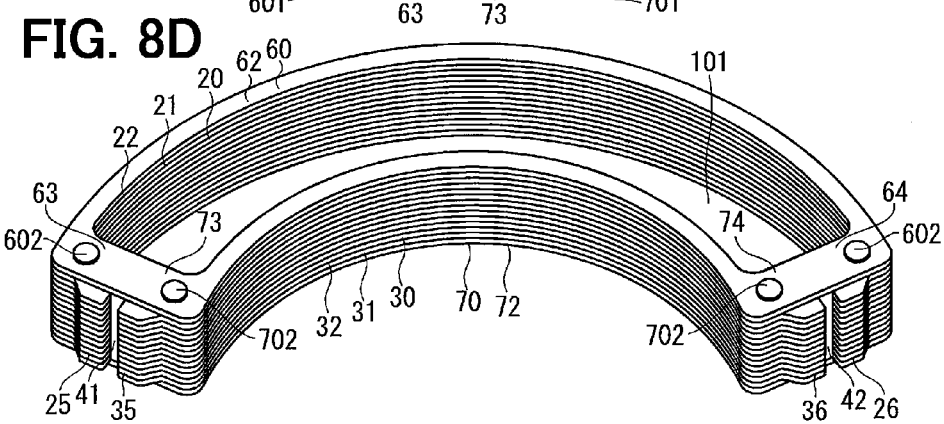

POSITION SENSING DEVICE HAVING MAGNETIX FLUX TRANSMISSION UNITS

CROSS REFERENCE TO RELATED APPLICATION

The present application is based on and claims the benefit of priority of Japanese Patent Applications No. 2013-117628, filed on Jun. 4, 2013 and No. 2014-057434, filed on Mar. 20, 2014, the disclosures of which are incorporated herein by reference.

TECHNICAL FIELD

The present disclosure generally relates to a position sensing device that detects a position of a detection object.

BACKGROUND INFORMATION

Generally, a magnetic-type position detector detects a change in the position of a detection object relative to a reference part. The magnetic-type position detector may utilize a magnetic flux generation unit such as a magnet. For example, a position sensing device disclosed in a patent document 1 (i.e., Japanese Patent Laid-Open No. JP-A-H08-292004) is configured to form a closed magnetic circuit having two magnets and two magnetic flux transmission units that are provided as the reference member. In such a structure, the two magnets or their magnetic poles are bound at in-between positions of end portions of the two magnetic flux transmission units, which may be more specifically described as a position between one of two longitudinal ends of respective magnetic flux transmission units that extend side-by-side. A gap space between the two magnetic flux transmission units has a spill magnetic flux flowing from one unit to the other. A flux density detection unit is configured to move together with the detection object within the gap between the two magnetic flux transmission parts and to output a detection signal according to the magnetic flux passing therethrough. Thereby, the position sensing device detects a position of a detection object relative to the reference member based on the signal outputted from the flux density detection unit.

In the position sensing device of the patent document 1, the dimension of the magnets along a magnetized direction is set to be the same as the width of the gap space between the two magnetic flux transmission units. Therefore, when the gap space between the two magnetic flux transmission units is large, the magnet must also have a large size, which may result in an increase in the manufacturing cost of the position sensing device. In such a case, two end portions (i.e., both sides) of the magnetic flux transmission unit may be modified to have a specific shape, for example, for reducing the size of the magnets that are put in between those end portions. When the size of each of the magnets along the magnetized direction is smaller, the cost of manufacturing the device is reduced. However, a complex shape of the end portions of the two magnetic flux transmission units may require use of complex material bending in order to form the magnetic flux transmission unit, or may require use of additional manufacturing processes such as forging, cutting, and the like, which may further increase the manufacturing cost.

Further, in the position sensing device of the patent document 1, the signal outputted from the flux density detection unit becomes large, when the flux density detection unit comes close to the magnet. Therefore, especially at the proximity of the magnetic, a linearity of the output signal from the flux density detection unit may deteriorate.

In the position sensing device of the patent document 1, the two identical magnets having the same size, material, etc. are disposed on both ends of the two magnetic flux transmission units with their magnetic pole directions reversed from each other. Therefore, at the center of the gap space between the two magnetic flux transmission units, a magnetic flux flow direction is reversed. In other words, a minimum position where an absolute value of the flux density falls to the minimum occurs at the center of the movable range of the flux density detection unit and the movable range of the detection object (i.e., at the center of the gap space between the two magnetic flux transmission units).

Generally, at the "minimum position where an absolute value of the flux density falls to the minimum" in the movable range of the flux density detection unit, the magnetic flux of the magnetic flux generation unit least affected by a temperature coefficient factor, which favors a resistance of the position sensing device to the temperature change. In other words, at the "minimum position where an absolute value of the flux density falls to the minimum" the position detection accuracy of the detection object is improved relative to the other positions. Therefore, in the position sensing device of the patent document 1, the position detection accuracy is high at the center position of the gap space between the two magnetic flux transmission units, and the position detection accuracy is low at positions other than the center position of the gap space, for example, near the ends of the gap space, etc. In other words, in the position sensing device in the patent document 1, positions having a high position detection accuracy regardless of the temperature change are limited to only the center of the movable range of the detection object. That is, if the position sensing device requires a high position detection accuracy near both ends of the movable range of the detection object, the position sensing device in the patent document 1 may be not suitable for such applications.

The position sensing device in the patent document 1 may still be usable if the shape of the magnetic flux transmission unit, for example, is modified to have a gradually-changing width of the magnetic flux transmission unit, or to have a gradually-changing gap space width between the two magnetic flux transmission units along the longitudinal direction of the gap space, for the purpose of improving linearity of the output signal from the flux density detection unit, or for the purpose of moving the high position detection accuracy position to a position other than the center position of the detection object movable range regardless of the temperature. However, in such a case, the complex shape of the magnetic flux transmission unit may result in increased manufacturing costs.

SUMMARY

It is an object of the present disclosure to provide a position sensing device that is easily manufactured regardless of a shape of a magnetic flux transmission unit.

In an aspect of the present disclosure, the position sensing device which detects a position of a detection object that moves relative to a reference member includes a first magnetic flux transmission unit, a second magnetic flux transmission unit, a first magnetic flux generation unit, a second magnetic flux generation unit, and a flux density detection unit.

The first magnetic flux transmission unit is formed by stacking a first thin board that is made of a magnetic body (i.e., from a magnetic material) having a long shape in a board thickness direction. The first magnetic flux transmission unit is provided on one of the reference member or the detection object.

The second magnetic flux transmission unit is formed by laminating/stacking a second thin board that is made of a magnetic body (i.e., from a magnetic material) having a long shape in the board thickness direction. The second magnetic flux transmission unit is provided on one of the reference member and the detection object so that the board thickness direction of the second thin board is parallel with the board thickness direction of the first thin board, and so that a position between the second magnetic flux transmission unit and the first magnetic flux transmission unit is defined as a gap space having a long shape.

The first magnetic flux generation unit is disposed at a position between one end of the first magnetic flux transmission unit and one end of the second magnetic flux transmission unit. Thereby, a magnetic flux generated by the first magnetic flux generation unit is transmitted (i) from one end of the first magnetic flux transmission unit or the second magnetic flux transmission unit (ii) to the other end of the first magnetic flux transmission unit or to the other end of the second magnetic flux transmission unit.

The second magnetic flux generation unit is disposed at a position between the other end of the first magnetic flux transmission unit and the other end of the second magnetic flux transmission unit. Thereby, a magnetic flux generated by the second magnetic flux generation unit is transmitted (i) from the other end of the first magnetic flux transmission unit or the second magnetic flux transmission unit (ii) to the one end of the first magnetic flux transmission unit or the second magnetic flux transmission unit.

The flux density detection unit is disposed on one of the reference member and the detection object to be movable relative to the other of the reference member and the detection object in the gap space along a gap space longitudinal direction of the gap space. The flux density detection unit outputs a signal according to a density of a magnetic flux passing therethrough. By the above-mentioned configuration, the position sensing device can detect a position of the detection object relative to the reference member based on the signal from the flux density detection unit.

In the present disclosure, the first magnetic flux transmission unit and the second magnetic flux transmission unit are formed by laminating/stacking the first thin board or the second thin board which is made of a magnetic body (i.e., from a magnetic material) having a long shape in the board thickness direction. Therefore, the first/second magnetic flux transmission unit may be easily formed to have any/arbitrary shape by laminating/stacking the first/second thin board that is made to have a suitable shape by press-forming process, for example. In other words, the first/second magnetic flux transmission unit is formed in any arbitrary shape at low cost.

Therefore, for example, by suitably forming an end shape of both ends of the first/second magnetic flux transmission unit, the size of the first/second magnetic flux generation unit is made to have a size that is smaller than the gap space between the first magnetic flux transmission unit and the second magnetic flux transmission unit, and the manufacturing cost of the position sensing device is reduced. Further, for example, (i) a width of the first/second magnetic flux transmission unit or (ii) a gap space between the first magnetic flux transmission unit and the second magnetic flux transmission unit may be changed along the longitudinal direction of the gap space by forming the first/second magnetic flux transmission unit to have a suitable shape, for the purpose of improving the linearity of the output signal from the flux density detection unit, or for the purpose of moving the high position detection accuracy position to a position other than the center position of the detection object movable range regardless of the temperature.

Thus, in the present disclosure, the first/second magnetic flux transmission unit is easily made while having a complex shape and low cost. Further, by devising a suitable shape of the first/second magnetic flux transmission unit, various problems in the prior art are solved.

BRIEF DESCRIPTION OF THE DRAWINGS

Objects, features, and advantages of the present disclosure will become more apparent from the following detailed description made with reference to the accompanying drawings, in which:

FIG. 7A is a plan view of the magnetic circuit component of the position sensing device according to a third embodiment of the present disclosure;

FIG. 7B is a view of the component of FIG. 7A in an arrow B direction according to the third embodiment of the present disclosure;

FIG. 7C is a sectional view along a VIIC-VIIC line of FIG. 7A according to the third embodiment of the present disclosure;

FIG. 7D is a perspective view of the magnetic circuit component according to the third embodiment of the present disclosure;

FIG. 8A is a plan view of the magnetic circuit component of the position sensing device according to a fourth embodiment of the present disclosure;

FIG. 8B is a view of the component of FIG. 8A in an arrow B direction according to the fourth embodiment of the present disclosure;

FIG. 8C is a sectional view along a VIIIC-VIIIC line of FIG. 8A according to the fourth embodiment of the present disclosure;

FIG. 8D is a perspective view of the magnetic circuit component according to the fourth embodiment of the present disclosure;

DETAILED DESCRIPTION

Figure 1:
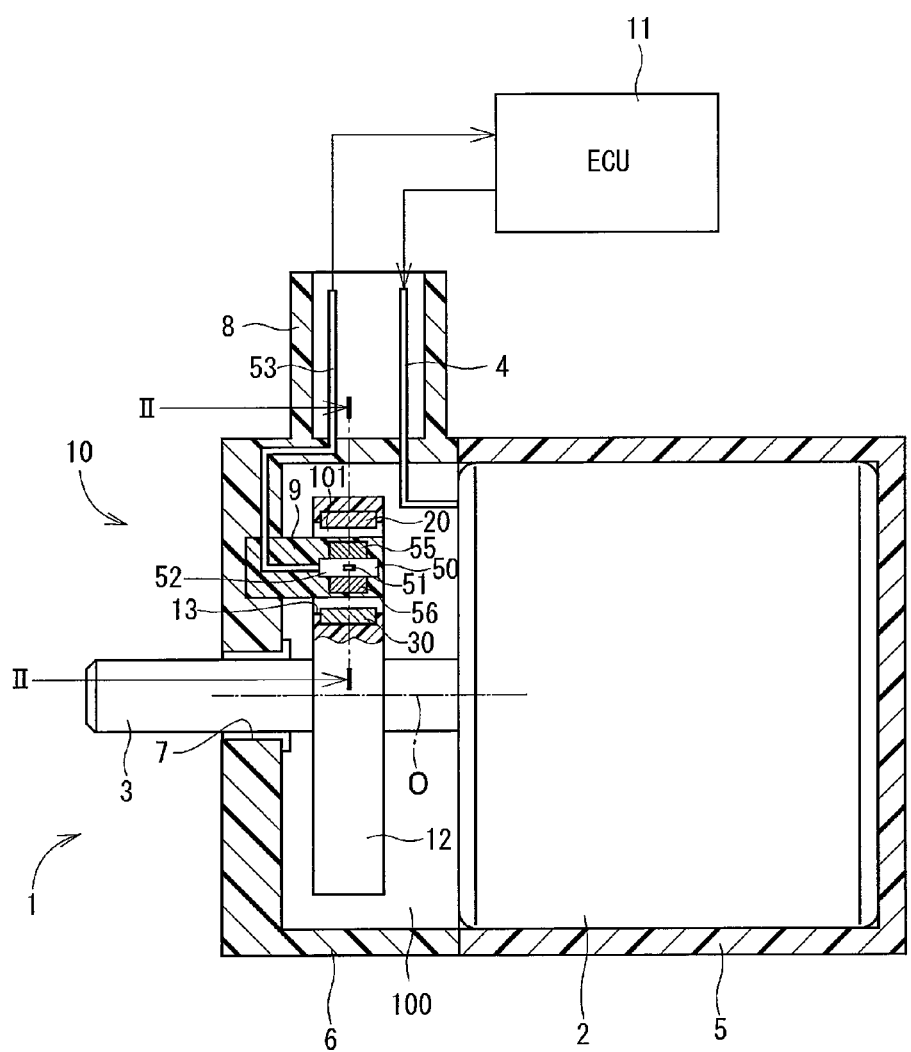
FIG. 1 is an illustrative sectional view of a position sensing device and an actuator in a first embodiment of the present disclosure.

Hereafter, a position sensing device and the actuator using such a device are described with reference to the drawing in many embodiments of the present disclosure. In the following embodiments, like numerals represent like parts, and the description of the same parts are not repeated.

(First Embodiment)

Figure 2:
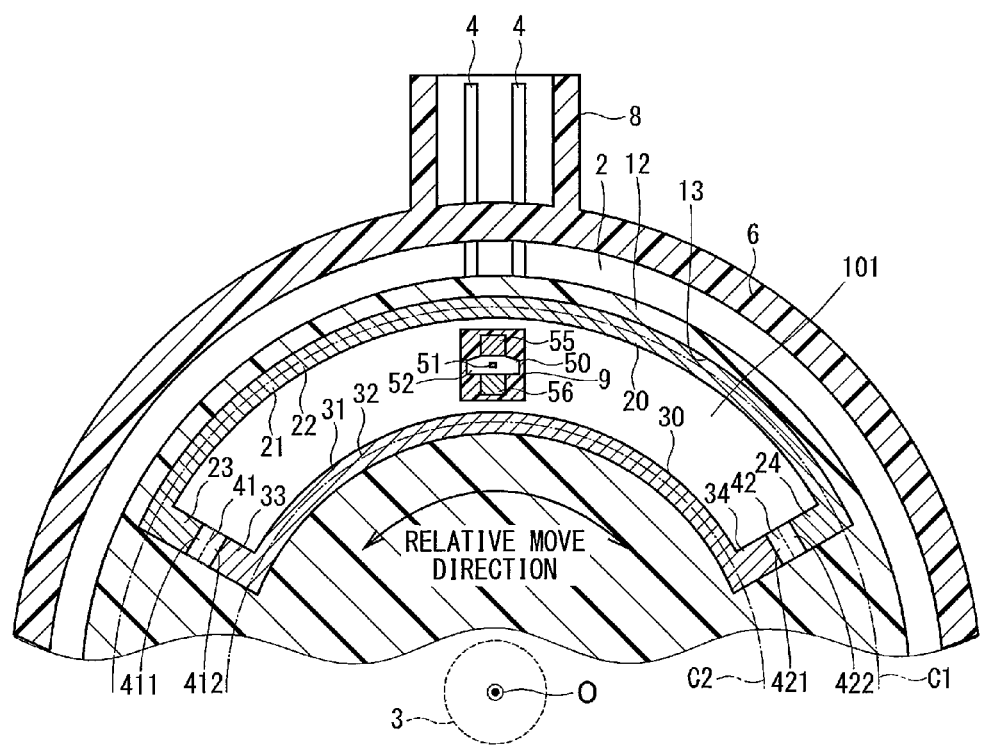
FIG. 2 is sectional view along a II-II line of FIG. 1.

The position sensing device in the first embodiment of the present disclosure and the actuator using the same are shown in FIG. 1 and FIG. 2. An actuator 1 is used as a driving source which drives, for example, a throttle valve of the vehicles which are not illustrated. The actuator 1 is provided with a motor 2, a housing 5, a cover 6, an electronic control unit (i.e., henceforth an "ECU") 11, a rotating body 12, a position sensing device 10 and the like.

As shown in FIG. 1, the motor 2 has an output shaft 3, a motor terminal 4 and the like. An electric power is supplied to the motor 2 via the motor terminal 4. With such an electric power, the motor 2 is driven to rotate. Rotation of the motor 2 is outputted from the output shaft 3. The output shaft 3 is connected to a throttle valve via a geartrain (not illustrated) or the like, for example. Therefore, when the motor 2 rotates, the throttle valve rotates too.

The housing 5 is formed in a shape of a cylinder having a bottom with resin, for example, and accommodates the motor 2 in an inside.

The cover 6 is formed in a shape of a cylinder having a bottom with resin, for example, and an opening of the cover 6 abuts on an opening of the housing 5 while a hole 7 formed on the bottom of the cover 6 has the output shaft 3 inserted therein. Thereby, a space 100 is formed between the cover 6 and the motor 2.

The cover 6 has a cylinder shape connector 8 that extends toward a radial outside of the cover 6 from its cylinder part. In an inside of the connector 8, an end of the motor terminal 4 is exposed. To the connector 8, an end of wire harness leading to the ECU 11 is connected. Thereby, the electric power from a battery which is not illustrated is supplied to the motor 2 via the ECU 11, the wire harness, and the motor terminal 4.

The ECU 11 is a computer provided with a CPU serving as a calculating unit, as well as ROM, RAM, an input output unit, etc. The ECU 11 controls an operation of various in-vehicle devices based on the signal from the sensor attached to each part of the vehicle, and the like.

The ECU 11 controls the electric power supplied to the motor 2, for example, based on an opening degree signal of an accelerator, etc. When the electric power is supplied to the motor 2, and the supplied electric power rotates the motor 2 and the throttle valve. Therefore, a throttle valve opens and closes an air intake passage and the amount of the intake air which flows through the air intake passage is adjusted. In the present embodiment, the ECU 11 may control a supply of the electric power to the motor 2 by an idle speed control (ISC) function, for example, irrespective of the opening signal of the accelerator.

The rotating body 12 is formed in a disk shape with resin, for example, and is provided in the space 100. The rotating body 12 is fixed on the output shaft 3 with the output shaft 3 extending therethrough at its center. Thereby, when the output shaft 3 rotates, the rotating body 12 rotates together with the output shaft 3. Since the output shaft 3 and the throttle valve are connected by the geartrain, the rotation position of the rotating body 12 is equivalent to the rotation position of the throttle valve.

According to the present embodiment, the position sensing device 10 detects the rotation position of the rotating body 12 that rotates relative to the cover 6. Therefore, with the position sensing device 10, when a rotation position of the rotating body 12 relative to the cover 6 is detected, the rotation position of the throttle valve is detectable and the opening degree of the throttle valve is detected. Therefore, the position sensing device 10 is usable as a throttle position sensor.

As shown in FIG. 1 and FIG. 2, the position sensing device 10 is provided with a first magnetic flux transmission unit 20, a second magnetic flux transmission unit 30, a first magnet 41 serving as the first magnetic flux generation unit, a second magnet 42 serving as the second magnetic flux generation unit, and a Hall IC 50 serving as the flux density detection unit, together with other parts.

The first magnetic flux transmission unit 20 is formed in a long shape by laminating/stacking multiple first thin boards 21 in the board thickness direction (see FIG. 3). According to the present embodiment, the first magnetic flux transmission unit 20 is formed by laminating/stacking the first thin board 21 of 12 sheets, for example. The first magnetic flux transmission unit 20 is disposed in an arc-shaped hole 13 formed on the rotating body 12 (see FIG. 2). The first thin board 21 is formed in a long board shape with a magnetic body (i.e., from a magnetic material), such as silicon steel, for example. The first thin board 21 has a main part 22 and extender parts 23, 24. The main part 22 is formed in an arc shape which extends in a longitudinal direction of the board 21 along a first virtual circular arc C1 centering on a rotation center O of the rotating body 12 (see FIG. 2). According to the present embodiment, at every position along the longitudinal direction, the main part 22 is formed to have the same width in a lateral direction. The extender part 23 is formed to extend toward a radial inside of the first virtual circular arc C1 from one end of the main part 22. The extender part 24 is formed to extend toward a radial inside of the first virtual circular arc C1 from the other end of the main part 22.

Figure 3A:
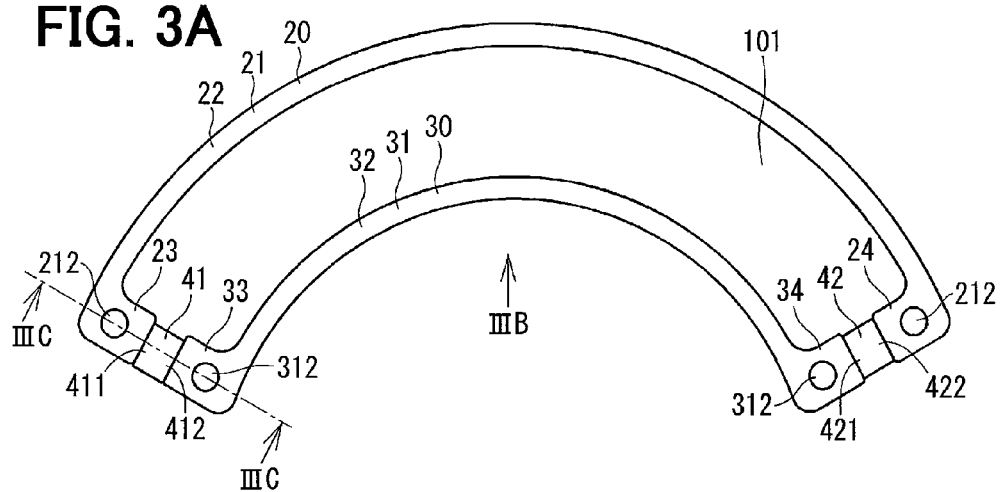
FIG. 3A is a plan view of a magnetic circuit component of the position sensing device according to the first embodiment of the present disclosure.
Figure 3B:
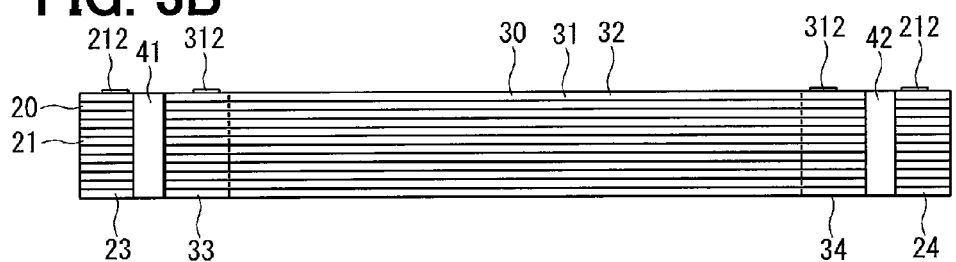
FIG. 3B is a view of the component of FIG. 3A in an arrow B direction according to the first embodiment of the present disclosure.
Figure 3C:
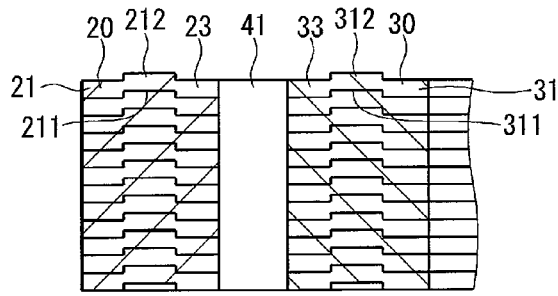
FIG. 3C is a sectional view along a IIIC-IIIC line of FIG. 3A according to the first embodiment of the present disclosure.

As shown in FIG. 3C, multiple first thin boards 21 are respectively formed in the same shape, and have a first concave region 211 that recedes from one surface of the board 21 in the board thickness direction and a first convex region 212 that protrudes from the other surface of the board 21 in a corresponding shape to the first concave region 211, and at a position corresponding to the first concave region 211. The first concave region 211 and the first convex region 212 are formed on the extender parts 23, 24 of the first thin board 21. The first magnetic flux transmission unit 20 is formed by laminating/stacking the first thin boards 21, with the first convex region 212 (i.e., a dowel) of one board 21 engaging with the first concave region 211 of the other board 21. Therefore, the first magnetic flux transmission unit 20 may be formed by joining multiple first thin boards 21, without using an adhesive or the like.

The second magnetic flux transmission unit 30 is formed to have a long shape by laminating/stacking multiple second thin boards 31 in the board thickness direction (see FIG. 3). According to the present embodiment, the second magnetic flux transmission unit 30 is formed by laminating/stacking the second thin board 31 of 12 sheets, for example. The second magnetic flux transmission unit 30 is disposed in the arc-shaped hole 13 formed on the rotating body 12 (see FIG. 2), together with the first magnetic flux transmission unit 20. The second thin board 31 is formed in a long board shape with a magnetic body (i.e., from a magnetic material), such as silicon steel, for example, which is similar to the first thin board 21. The second thin board 31 has a main part 32 and extender parts 33, 34. The main part 32 is formed in an arc shape which extends in a longitudinal direction of the board 31 along a second virtual circular arc C2 centering on the rotation center O of the rotating body 12 (see FIG. 2). The extender part 33 is formed to extend toward a radial outside of the second virtual circular arc C2 from one end of the main part 32. The extender part 34 is formed to extend toward a radial outside of the second virtual circular arc C2 from the other end of the main part 32.

As shown in FIG. 3C, multiple second thin boards 31 are respectively formed in the same shape, and have a second concave region 311 that recedes from one surface of the board 31 in the board thickness direction and a second convex region 312 that protrudes from the other surface of the board 31 in a corresponding manner to the second concave region 311. The second concave region 311 and the second convex region 312 are formed on the extender parts 33, 34 of the second thin board 31. The second magnetic flux transmission unit 30 is formed by laminating/stacking the second thin boards 31, with the second convex region 312 (i.e., a dowel) of one board 31 engaging with the second concave region 311 of the other board 31. Therefore, the second magnetic flux transmission unit 30 may be formed by joining multiple second thin boards 31, without using an adhesive or the like.

As shown in FIG. 1 and FIG. 2, the first magnetic flux transmission unit 20 and the second magnetic flux transmission unit 30 are formed in the hole 13 of the rotating body 12 so that the main part 22 of the first thin board 21 and the main part 32 of the second thin board 31 face each other in a radial direction of the first virtual circular arc C1. Thereby, an arc-shaped gap space 101 is formed between the main part 22 of multiple first laminated thin boards 21, and the main part 32 of multiple second laminated thin boards 31 (see FIG. 2). That is, as shown in FIG. 2 and FIG. 3, the second magnetic flux transmission unit 30 is formed in the rotating body 12 so that the board thickness direction of the second thin board 31 is in parallel with the board thickness direction of the first thin board 21, and so that a position between the first magnetic flux transmission units 20 and the second magnetic flux transmission unit 30 is defined as the arc-shaped gap space 101.

The first magnet 41 is a permanent magnet, such as a neodymium magnet or a ferrite magnet, for example. The first magnet 41 has a magnetic pole 411 on one end, and has a magnetic pole 412 on the other end. The first magnet 41 is magnetized so that the magnetic pole 411 serves as an S pole, and the magnetic pole 412 serves as an N pole. The first magnet 41 is positioned in between the extender part 23 and the extender part 33 so that the magnetic pole 411 abuts the extender part 23 of the first magnetic flux transmission unit 20, and the magnetic pole 412 abuts the extender part 33 of the second magnetic flux transmission unit 30. In other words, the first magnet 41 is bound by two ends of the two facing magnetic flux transmission parts, i.e., by one end of the first magnetic flux transmission unit 20 and one end of the second magnetic flux transmission unit 30. Thereby, the magnetic flux generated by the magnetic pole 412 of the first magnet 41 is transmitted to the extender part 34 via the main part 32 from the extender part 33 of the second magnetic flux transmission unit 30.

The second magnet 42 is a permanent magnet, such as a neodymium magnet or a ferrite magnet, for example. The second magnet 42 has a magnetic pole 421 on one end, and has a magnetic pole 422 on the other end. The second magnet 42 is magnetized so that the magnetic pole 421 serves as an S pole, and the magnetic pole 422 serves as an N pole. The second magnet 42 is positioned in between the extender part 34 and the extender part 24 so that the magnetic pole 421 abuts the extender part 34 of the second magnetic flux transmission unit 30, and the magnetic pole 422 abuts the extender part 24 of the first magnetic flux transmission unit 20. In other words, the second magnet 42 is bound by two ends of the two facing magnetic flux transmission parts, i.e., by the other end of the first magnetic flux transmission unit 20 and the other end of the second magnetic flux transmission unit 30. Thereby, the magnetic flux generated by the magnetic pole 422 of the second magnet 42 is transmitted to the extender part 23 via the main part 22 from the extender part 24 of the first magnetic flux transmission unit 20.

As shown in FIG. 2, the first magnet 41 and the second magnet 42 are respectively formed to have a dimension in the magnetized direction configured to be smaller than a width dimension (i.e., in the lateral direction) of the gap space 101. In other words, the size of the first/second magnet does not depend on the size of the gap space 101.

In the present embodiment, the first magnet 41 and the second magnet 42 are respectively configured to be permanents magnet having the same magnet volume and the same magnetized arrangement, the same magnet type (e.g., a neodymium magnet, a ferrite magnet, etc.), the same material composition (e.g., the same rate of neodymium, iron, boron with the same content rate of dysprosium, etc., if the magnets 41, 42 are neodymium magnets; or the same contents rate of barium, strontium, etc. if the magnets 41, 42 are ferrite magnets). Therefore, the spill magnetic flux flows to the first magnetic flux transmission unit 20 from the second magnetic flux transmission unit 30 at a position between the longitudinal center of the gap space 101 and the first magnet 41, and the spill magnetic flux flows to the second magnetic flux transmission unit 30 from the first magnetic flux transmission unit 20 at a position between the longitudinal center of the gap space 101 and the second magnet 42. Further, the closer that a position along the longitudinal direction of the gap space 101 is to the first/second magnet 41/42, the greater an absolute value of the density of the magnetic flux becomes. Further, the density of the magnetic flux is equal to zero at the longitudinal center of the gap space 101.

Further, the magnetic flux at positions around the magnet 41 "flies" from the magnetic pole 412 to the magnetic pole 411, and the magnetic flux at positions around the magnet 42 "flies" from the magnetic pole 422 to the magnetic pole 421.

Figure 3D:
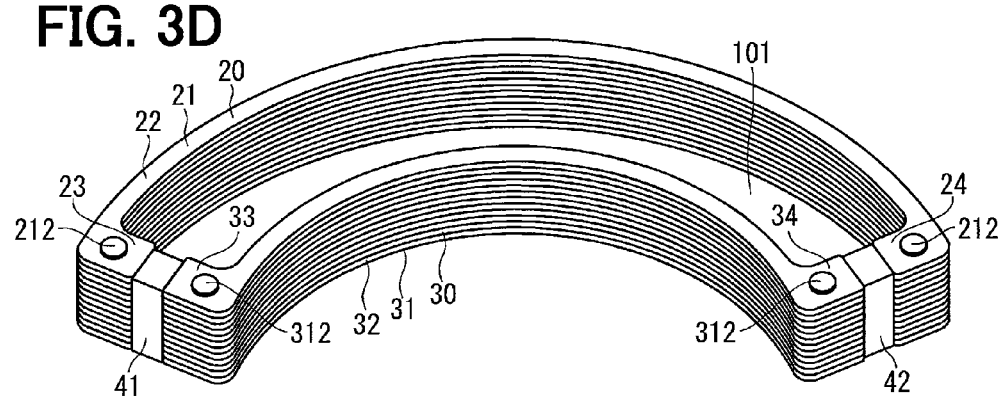
FIG. 3D is a perspective view of the magnetic circuit component according to the first embodiment of the present disclosure.

As shown in FIG. 3D, the first magnetic flux transmission unit 20 and the second magnetic flux transmission unit 30 stick (i.e., attach) to the first magnet 41 and the second magnet 42 by the magnetic force of the first magnet 41 and the second magnet 42 in a pre-assembled state before being attached to the rotating body 12. Thereby, the first magnetic flux transmission unit 20, the second magnetic flux transmission unit 30, the first magnet 41, and the second magnet 42 (i.e., magnetic circuit components) are unified (i.e., mutually connected). Further, if a certain force exceeding a threshold is applied to the above-described magnetic circuit components connected by the magnetic force, the components can be separated to individual components, that is, can be separated back to (i.e., connection between the components is released) the first magnetic flux transmission unit 20, the second magnetic flux transmission unit 30, the first magnet 41, and the second magnet 42.

As shown in FIG. 1, the Hall IC 50 has a Hall element 51 as a signal output element, a sealed body 52, and a sensor terminal 53, and the like. The Hall element 51 outputs a signal according to the density of the magnetic flux passing therethrough. The sealed body 52 has a rectangular board shape made of resin, for example. The sensor terminal 53 has its one end connected to the Hall element 51. The sealed body 52 covers the entire Hall element 51, and the one end side of the sensor terminal 53. In this case, the Hall element 51 is positioned at the center of the sealed body 52.

The sealed body 52 sealing the Hall IC 50 and the one end side of the sensor terminal 53 are molded by a mold part 9. The mold part 9 has, for example, a square column shape made of resin. The sealed body 52 of the Hall IC 50 is positioned on the one end side of the mold part 9.

The mold part 9 is disposed on the cover 6 so that the one end of the mold part 9 is positioned in the gap space 101, and so that the other end is connected to the bottom of the cover 6. Thereby, in the gap space 101 between the first magnetic flux transmission unit 20 and the second magnetic flux transmission unit 30, the Hall IC 50 rotates in the longitudinal direction of the gap space 101 relative to the rotating body 12. In the above, the cover 6 and the mold part 9 correspond to a "reference member" in the claims, and the rotating body 12 corresponds to a "detection object" in the claims.

The sensor terminal 53 of the Hall IC 50 is insert-molded on the cover 6 so that the other end of the sensor terminal 53 is exposed to an inside of the connector 8 on the cover 6. Therefore, when one end of the wire harness leading to the ECU 11 is connected to the connector 8, the Hall element 51 of the Hall IC 50 and the ECU 11 are connected with each other. Thereby, the signal from the Hall element 51 is transmitted to the ECU 11.

Here, the magnetic flux passing through the Hall element 51 of the Hall IC 50 is mainly made of the spill magnetic flux which flows through the gap 101 in between the first magnetic flux transmission unit 20 and the second magnetic flux transmission unit 30 either (i) from the second magnetic flux transmission unit 30 to the first magnetic flux transmission unit 20, or (ii) from the first magnetic flux transmission unit 20 to the second magnetic flux transmission unit 30.

As shown in FIG. 1 and FIG. 2, in the present embodiment, a magnetic flux collecting part 55 and a magnetic flux collecting part 56 are provided in the mold part 9.

The magnetic flux collecting part 55 is made of a relatively high magnetically permeable material such as a permalloy or the like, and has a hexahedron body. The magnetic flux collecting part 55 is disposed on a first side of the mold 9 so that the collecting part 55 is molded in a state in which a predetermined face of the collecting part 55 faces or abuts a center of one face on one side, which is close to the first magnetic flux transmission unit 20, of the sealed body 52 of the Hall IC 50. An opposite face of the first magnetic flux collecting part 55, which is opposite to the predetermined face described above, faces the main part 22 of the first thin board 21 of the first magnetic flux transmission unit 20.

The magnetic flux collecting part 56 is, similar to the collecting part 55, made of a relatively high magnetically permeable material such as a permalloy or the like, and has a hexahedron body. The magnetic flux collecting part 56 is disposed on a second side of the mold 9 so that the collecting part 56 is molded in a state in which a predetermined face of the collecting part 56 faces or abuts a center of one face on one side, which is close to the second magnetic flux transmission unit 30, of the sealed body 52 of the Hall IC 50. An opposite face of the first magnetic flux collecting part 55, which is opposite to the predetermined face described above, faces the main part 32 of the second thin board 31 of the second magnetic flux transmission unit 30.

Thus, the Hall IC 50 is sandwiched or bound in between the magnetic flux collecting part 55 and the magnetic flux collecting part 56 to make a facing structure of the magnetic flux collecting part 55 and the magnetic flux collecting part 56, in the same manner and in the same direction as a facing structure between the first magnetic flux transmission unit 20 and the second magnetic flux transmission unit 30. In such manner, the spill magnetic flux which flows through the gap 101 between the first magnetic flux transmission part 20 and the second magnetic flux transmission part 30 is concentrated, and is directed to flow to (i.e., pass through) the Hall IC 50.

As mentioned above, in the present embodiment, the spill magnetic flux flows to the first magnetic flux transmission unit 20 from the second magnetic flux transmission unit 30 at a position between the longitudinal center of the gap space 101 and the first magnet 41, and the spill magnetic flux flows to the second magnetic flux transmission unit 30 from the first magnetic flux transmission unit 20 at a position between the longitudinal center of the gap space 101 and the second magnet 42. Further, the closer that a position to the first magnet 41 or the second magnet 42 is in the longitudinal direction of the gap space 101, the larger the absolute value of the density of the magnetic flux becomes.

Figure 4:
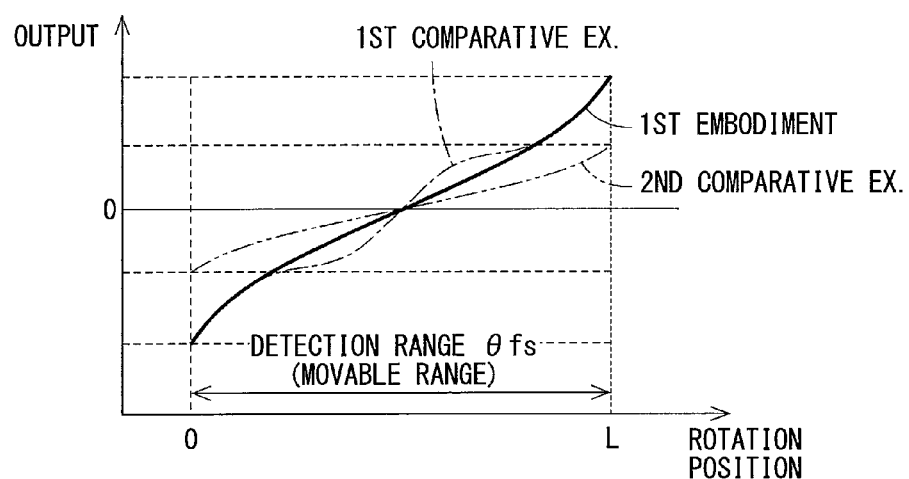
FIG. 4 is a graph of relationship between an output of a Hall IC of the position sensing device and a rotation position of a detection object in the first embodiment of the present disclosure.

Therefore, when a flow direction of the magnetic flux from the second magnetic flux transmission unit 30 to the first magnetic flux transmission unit 20 is defined as a negative flow direction, for example, when the position of the Hall IC 50 moves relative to the rotating body 12 from a proximity of the first magneto 41 to a proximity of the second magneto 42 in the gap space 101, the flux density monotonically increases from a negative value to a positive value, thereby (i) enabling an identification of a rotation position based on the magnetic flux density value and (ii) enabling a positioning based on the output from the Hall IC 50 (see FIG. 4).

By the above-mentioned configuration, the ECU 11 can detect the rotation position of the rotating body 12 relative to the cover 6 based on the signal from the Hall IC 50. Thereby, the rotation position and the opening degree of the throttle valve are detectable.

Figure 5:
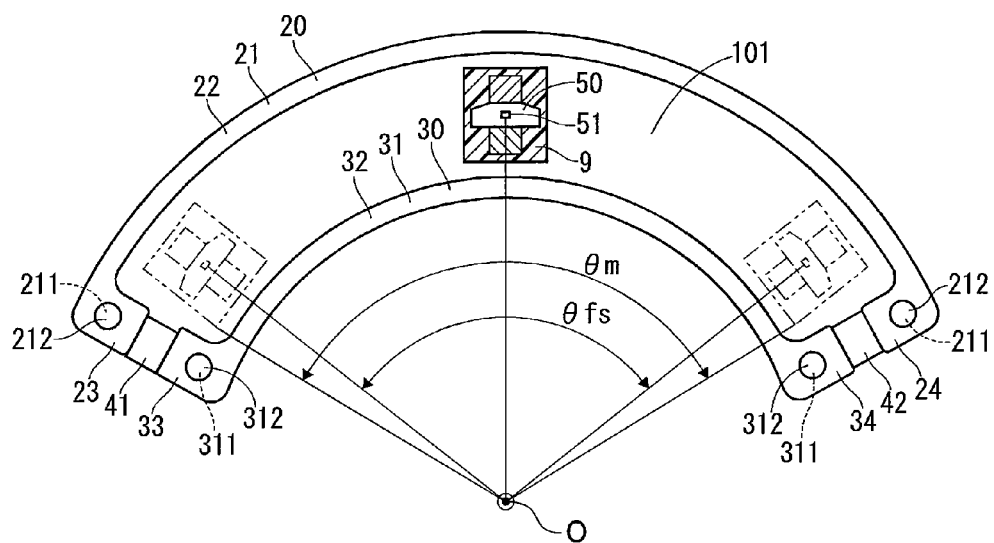
FIG. 5 is a plan view of a detection range of the position sensing device in a second embodiment of the present disclosure.

Further, as shown in FIG. 5, when a detection range θfs is defined as a movable range of the Hall IC 50 relative to the first/second magnetic flux transmission units 20, 30, the first concave region 211 and the first convex region 212 of the first thin board 21 as well as the second gap space 311 and the second convex part 312 of the second thin board 31 are disposed outside of the detection range θfs. Further, in the present embodiment, when a relative move range θm is defined as a rotation range of the mold part 9 together with the Hall IC 50, the first concave region 211, the first convex region 212, the second concave region 311, and the second convex region 312 are disposed outside of the relative move range θm.

Next, a part of a manufacturing process of the position sensing device 10 is described below. The manufacturing process of the position sensing device 10 includes the following process.

(Thin Board Formation Process)

The first thin board 21 and the second thin board 31 having a shape shown in FIG. 3 are formed by a press process of thin boards such as silicon steel or the like.

(Concavo-Convex Formation Process)

The first concave region 211, the first convex region 212 (i.e., a dowel), the second gap space 311, and the second convex part 312 (i.e., a dowel) are formed in each of the first thin board 21 and the second thin board 31.

(Laminating/Stacking Process)

The first thin boards 21 are laminated by engaging the first concave region 211 of one first thin board 21 with the first convex region 212 (i.e., a dowel) of the other first thin board 21, for forming the first magnetic flux transmission unit 20. Further, the second thin boards 31 are laminated by engaging the second concave region 311 of one second thin board 31 with the second convex region 312 (i.e., a dowel) of the other second thin board 31, for forming the second magnetic flux transmission unit 30.

(Magnet Joining Process)

The first magnet 41 is made to stick (i.e., attach) to the extender part 23 of the first magnetic flux transmission unit 20, and to the extender part 33 of the second magnetic flux transmission unit 30 by the magnetic force thereof, and the second magnet 42 is made to stick (i.e., attach) to the extender part 24 of the first magnetic flux transmission unit 20, and to the extender part 34 of the second magnetic flux transmission unit 30 by the magnetic force thereof. Thereby, the first magnetic flux transmission unit 20, the second magnetic flux transmission unit 30, the first magnet 41, and the second magnet 42 are unified to have one body (i.e., are mutually connected).

(Mold Process)

The first magnetic flux transmission unit 20, the second magnetic flux transmission unit 30, the first magnet 41, and the second magnet 42 (i.e., magnetic circuit components) which are unified are assembled to the rotating body 12. More specifically, (i) by putting in a mold a unified body of the first magnetic flux transmission unit 20, the second magnetic flux transmission unit 30, the first magnet 41, and the second magnet 42 and (ii) by pouring resin into the mold, which is a material for making the rotating body 12, the rotating body 12 is insert-molded in which the first magnetic flux transmission unit 20, the second magnetic flux transmission unit 30, the first magnet 41, and the second magnet 42 are included.

As described above, in the present embodiment, the first magnetic flux transmission unit 20 and the second magnetic flux transmission unit 30 are formed by laminating/stacking, in the board thickness direction, the first thin boards 21 and the second thin boards 31 which are magnetic bodies having long shapes. Therefore, the first magnetic flux transmission unit 20 and the second magnetic flux transmission unit 30 are easily made in any shape by, for example, press-processing the first thin board 21 and the second thin board 31 in an arbitrary shape. Thus, the first magnetic flux transmission unit 20 and the second magnetic flux transmission unit 30 may be formed in any shape at low cost.

According to the present embodiment, the first thin board 21 of the first magnetic flux transmission unit 20 has the extender parts 23, 24 on both ends. Further, the second thin board 31 of the second magnetic flux transmission unit 30 has the extender parts 33, 34 on both ends. Thereby, the length (i.e., the size) of the first magnet 41 and the second magnet 42 along the magnetized direction is made to be smaller than the width of the gap space 101 along the latitude direction. As a result, a cost of the component (i.e., the magnet) is reduced.

According to the present embodiment, the shape of both ends of the first magnetic flux transmission unit 20 and the second magnetic flux transmission unit 30 is complicated because the first magnetic flux transmission unit 20 and the second magnetic flux transmission unit 30 have the extender parts 23, 24 and the extender parts 33, 34. However, the first magnetic flux transmission unit 20 and the second magnetic flux transmission unit 30 are formed by laminating/stacking the first thin board 21 and the second thin board 31. Therefore, without employing additional manufacturing processes such as forging, cutting, and the like, such a complex shape for both ends of the first magnetic flux transmission unit 20 and the second magnetic flux transmission unit 30 is easily formed by press-processing of the first thin board 21 and the second thin board 31. Thus, in the present embodiment, the problem (i.e., an increase of the component cost) in the conventional technique is resolved, which enables manufacturing of a complicated-shape first/second magnetic flux transmission unit 20, 30 at low cost.

In the present embodiment, the first thin board 21 has (i) the first concave region 211 that recedes from one surface of the board 21 in the board thickness direction and (ii) the first convex region 212 that projects from the other surface of the board 21 in the board thickness direction in a shape corresponding to the first concave region 211 at a position corresponding to the first concave region 211. The first magnetic flux transmission unit 20 is formed by laminating/stacking, in the board thickness direction, one first thin board 21 with the other board 21 with the first convex region 212 of one board 21 engaged with the first concave region 211 of the other board 21. Further, the second thin board 31 has (i) the second concave region 311 that recedes from one surface of the board 31 in the board thickness direction and (ii) the second convex region 312 that projects from the other surface of the board 31 in the board thickness direction in a shape corresponding to the second concave region 311 at a position corresponding to the second concave region 311. The second magnetic flux transmission unit 30 is formed by laminating/stacking, in the board thickness direction, one second thin board 31 with the other board 31 with the second convex region 312 of one board 31 engaged with the second concave region 311 of the other board 31. Thereby, the first magnetic flux transmission unit 20 and the second magnetic flux transmission unit 30 may be made, without using adhesives or the like. Thus, a manufacturing cost is further reduced.

Figure 22:
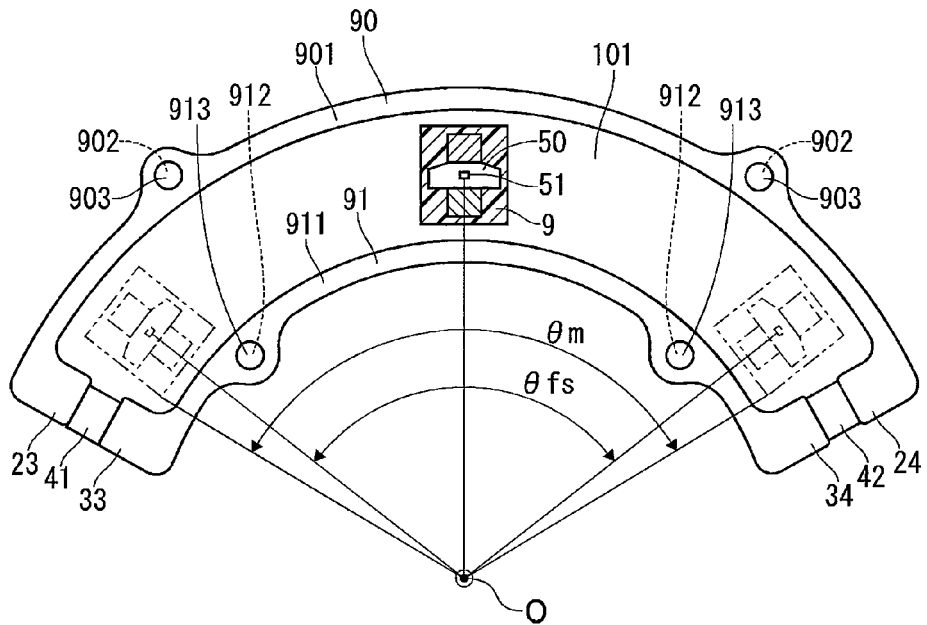
FIG. 22 is an illustration of a detection range of the position sensing device in a first comparison example.
Figure 23:
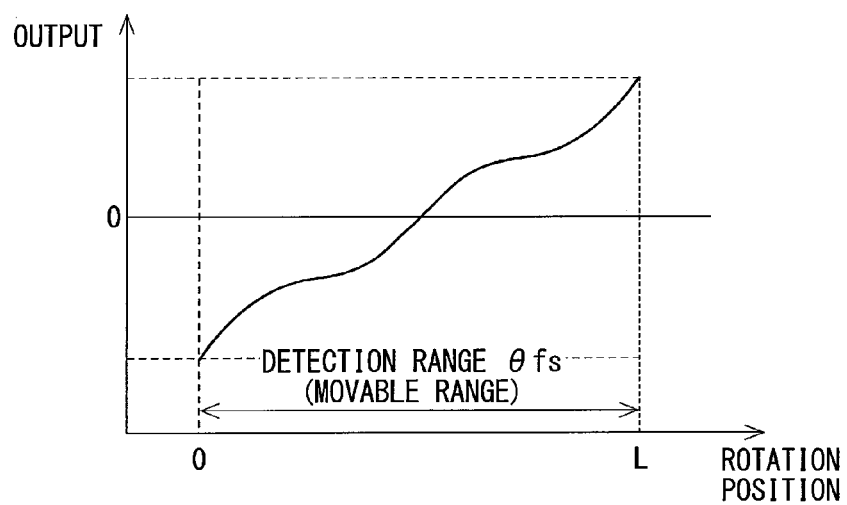
FIG. 23 is a graph of relationship between an output of the Hall IC of the position sensing device and a rotation position of the detection object in the first comparison example.

Here, the first comparative example shown in FIG. 22 is described. In the first comparative example, a first concave 902, a first convex 903, a second concave 912, and a second convex 913 are disposed inside of or within the detection range θfs. In this "inside" configuration, the width of a main part 901 and a main part 911 at positions of the concave regions 902, 912 and the convex regions 903, 913 must be widened in the lateral direction. Thus, the size of the cross section of a first magnetic flux transmission unit 90 and a second magnetic flux transmission unit 91 is relatively large at the positions of the concave regions 902, 912 and the convex regions 903, 913 within the detection range θfs. Therefore, the amount of the spill magnetic flux spilling into the gap space 101 is changed at the positions of the concave regions and the convex regions due to the magnetic resistance change caused by the increased cross-sectional size of the main parts 90, 91, which causes a deterioration of the linearity of the output signal from the Hall IC 50 as shown in FIG. 23.

Figure 24:
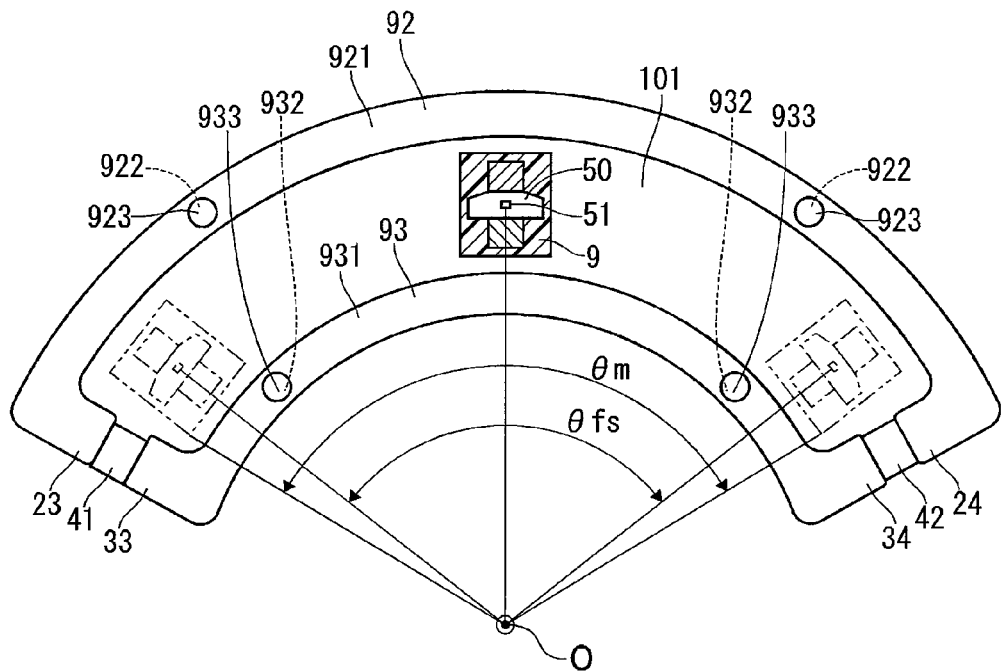
FIG. 24 is an illustration of a detection range of the position sensing device in a second comparison example.
Figure 25:
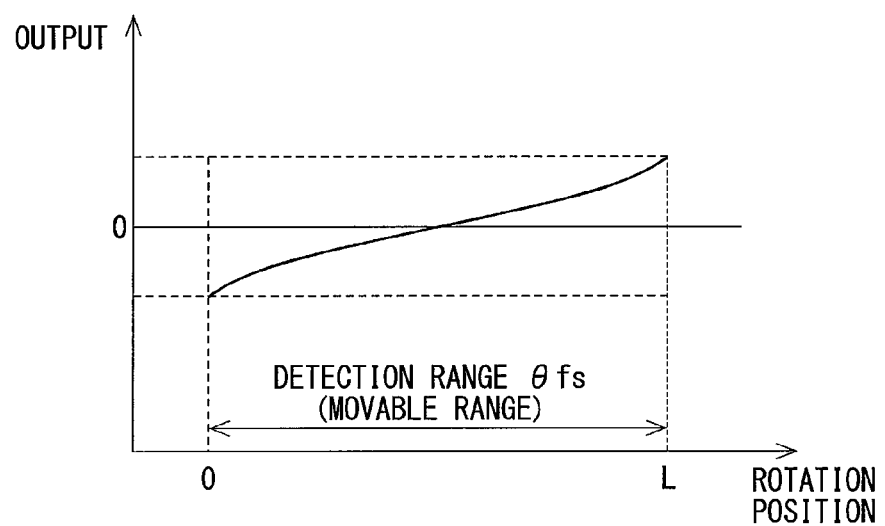
FIG. 25 is a graph of relationship between an output of the Hall IC of the position sensing device and a rotation position of the detection object in the second comparison example.

Next, the second comparative example shown in FIG. 24 is described. In the second comparative example, a first concave 922, a first convex 923, a second concave 932, and a second convex 933 are disposed in an inside of or within the detection range θfs, and in addition, the width of main parts 921, 931 in the lateral direction is configured to be wider than the concave regions 922, 932 and the convex regions 923, 933. In this "inside" configuration of the second comparative example, the size of the cross section of a first magnetic flux transmission unit 92 and a second magnetic flux transmission unit 93 is constant all through the detection range θfs at any rotation position, which resolves a problem of the deteriorated linearity of the output signal from the Hall IC 50 in the first comparative example. However, the amount of the spill magnetic flux spilling into the gap space 101 is reduced in general due to the increased cross section size of the first/second magnetic flux transmission units 92, 93, resulting in a decrease of the dynamic range of the magnetic flux density as shown in FIG. 25.

In view of the above, on the other hand, the present embodiment enables an improved linearity of the output signal of the Hall IC 50 and, at the same time, an improved dynamic range of the magnetic flux density. That is, as shown in FIG. 5, the first concave region 211, the first convex region 212, the second gap space 311, and the second convex part 312 are disposed outside of rotation range θm relative to the rotating body 12. Therefore, the size of the cross section of the first magnetic flux transmission unit 20 and the second magnetic flux transmission unit 30 is constant at any rotation position within the detection range θfs, and the size of the cross section of the first/second magnetic flux transmission units 20, 30 may be made smaller than the size of the cross section of the first/second magnetic flux transmission units 92, 93. Therefore, as shown in FIG. 4, the linearity of the output signal of the Hall IC 50 is increased in comparison to the first comparison example, and the dynamic range of the magnetic flux density is increased in comparison to the second comparative example.

(Second Embodiment)

Figure 6A:
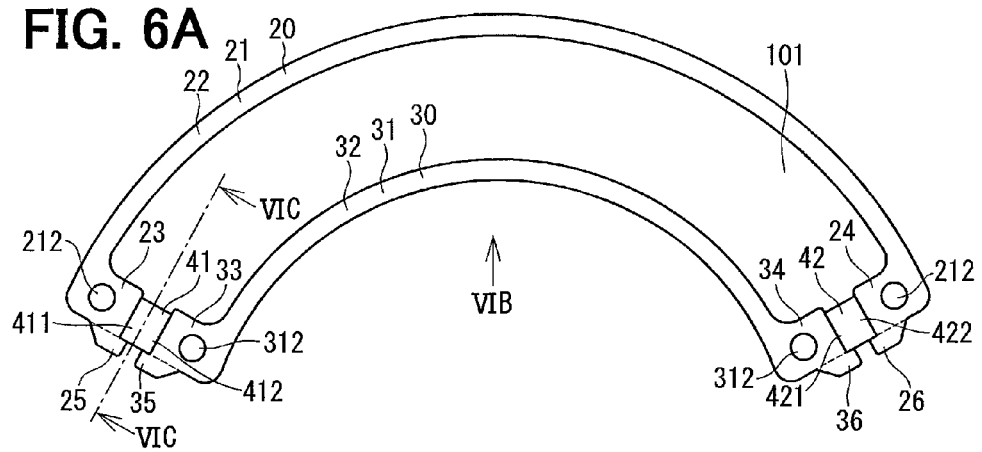
FIG. 6A is a plan view of the magnetic circuit component of the position sensing device according to the second embodiment of the present disclosure.
Figure 6B:
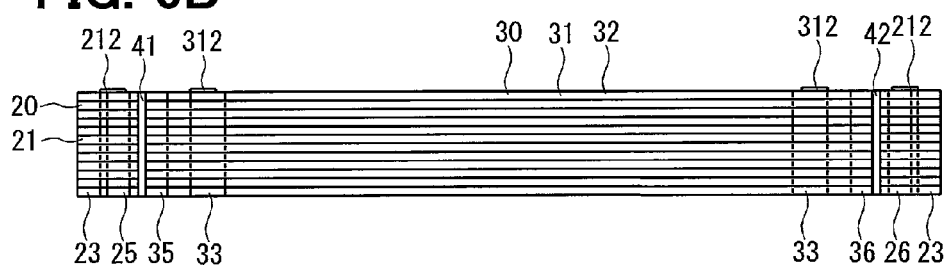
FIG. 6B is a view of the component of FIG. 6A in an arrow B direction according to the second embodiment of the present disclosure.
Figure 6C:
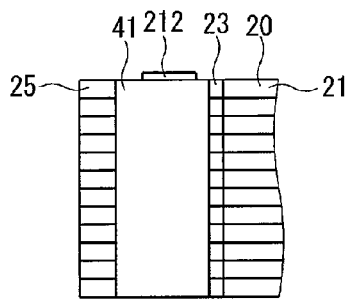
FIG. 6C is a sectional view along a VIC-VIC line of FIG. 6A according to the second embodiment of the present disclosure.
Figure 6D:
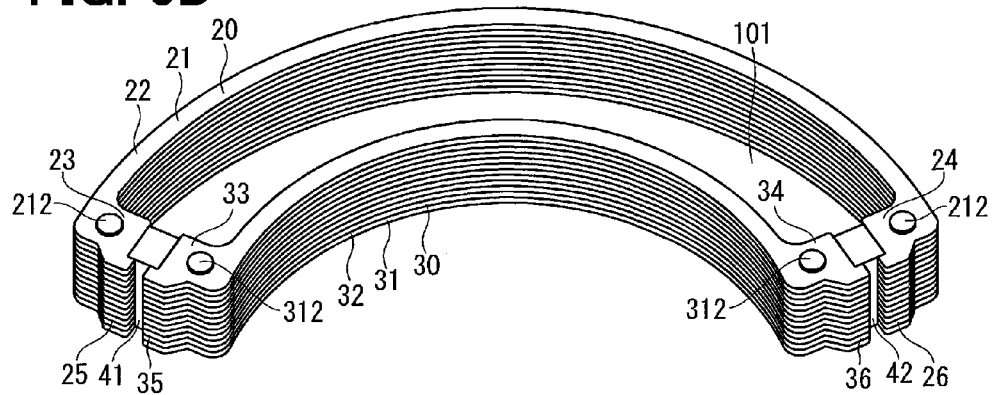
FIG. 6D is a perspective view of the magnetic circuit component according to the second embodiment of the present disclosure.

The second embodiment of the present disclosure regarding the position sensing device is shown in FIGS. 6A/B/C/D. Compared to the first embodiment, the second embodiment differs in the shape of the first magnetic flux transmission unit and the second magnetic flux transmission unit, etc.

According to the second embodiment, the first thin board 21 has first engagement parts 25 and 26. Further, the second thin board 31 in the second embodiment has second engagement parts 35 and 36.

The first engagement part 25 extends from the extender part 23 of the first thin board 21, and a tip part of the first engagement part 25 is positioned on one side of the first magnet 41 away from (i.e., opposite to) the second magnet 42 in the longitudinal direction of the gap space 101. The first engagement part 26 extends from the extender part 24 of the first thin board 21, and a tip part of the first engagement part 26 is positioned on one side of the second magnet 42 away from (i.e., opposite to) the first magnet 41 in the longitudinal direction of the gap space 101. According to the present embodiment, the first engagement parts 25 and 26 are formed on all the first thin boards 21 (i.e., 12 sheets) that form the first magnetic flux transmission unit 20.

The second engagement part 35 extends from the extender part 33 of the second thin board 31, and a tip part of the second engagement part 35 is positioned on one side of the first magnet 41 away from (i.e., opposite to) the second magnet 42 in the longitudinal direction of the gap space 101. The second engagement part 36 extends from the extender part 34 of the second thin board 31, and a tip part of the second engagement part 36 is positioned on one side of the second magnet 42 away from (i.e., opposite to) the first magnet 41 in the longitudinal direction of the gap space 101. According to the present embodiment, the first engagement parts 35 and 36 are formed on all the second thin boards 31 (i.e., 12 sheets) that form the first magnetic flux transmission unit 20.

According to the present embodiment, the first engagement part 25 and the second engagement part 35 regulate, by holding the first magnet 41 in an engaging manner, a movement of the first magnet 41 in the longitudinal direction of the gap space 101 relative to the first magnetic flux transmission unit 20 and the second magnetic flux transmission unit 30. Further, the first engagement part 26 and the second engagement part 36 regulate, by holding the second magnet 42 in an engaging manner, a movement of the second magnet 42 in the longitudinal direction of the gap space 101 relative to the first magnetic flux transmission unit 20 and the second magnetic flux transmission unit 30. Thereby, the position of the first magnet 41 and the position of the second magnet 42 in the longitudinal direction of the gap space 101 of the first magnet 41 and the second magnet 42 are determined.

According to the present embodiment, even though the shape of a part at the proximity of the first/second engagement parts 25, 26, 35, 36 is complex, such a complex shape of the first/second magnetic flux transmission units 20, 30 is easily made simply by laminating/stacking the first/second thin boards 21, 31.

(Third Embodiment)

The second embodiment of the present disclosure regarding the position sensing device is partially shown in FIGS. 7A/B/C/D. Compared to the second embodiment, the third embodiment differs in the shape of the first magnetic flux transmission unit and the second magnetic flux transmission unit, etc.

According to the second embodiment, the first engagement parts 25 and 26 are formed on some (i.e., three) of the multiple first thin boards 21 that form the first magnetic flux transmission unit 20 (see FIGS. 7B/C/D). More specifically, the first engagement parts 25 and 26 are formed on the first, seventh, and twelfth sheets of the first thin boards 21 to be laminated/stacked among 12 sheets.

Further, the second engagement parts 35 and 36 are formed on some (i.e., three) of the multiple second thin boards 31 that form the second magnetic flux transmission unit 30 (see FIGS. 7B/C/D). More specifically, the second engagement parts 35 and 36 are formed on the first, seventh, and twelfth sheets of the second thin boards 31 to be laminated/stacked among 12 sheets.

According to the present embodiment, the first engagement part 25 and the second engagement part 35 regulate, by holding the first magnet 41 in an engaging manner, a movement of the first magnet 41 in the longitudinal direction of the gap space 101 relative to the first magnetic flux transmission unit 20 and the second magnetic flux transmission unit 30. The first engagement part 26 and the second engagement part 36 regulate, by holding the second magnet 42 in an engaging manner, a movement of the second magnet 42 in the longitudinal direction of the gap space 101 relative to the first magnetic flux transmission unit 20 and the second magnetic flux transmission unit 30. Thereby, the position of the first magnet 41 and the position of the second magnet 42 in the longitudinal direction of the gap space 101 are determined similar to the second embodiment.

According to the above-mentioned second embodiment, the first engagement parts 25 and 26 are formed on all of the first thin boards 21 (i.e., on all of the 12 sheets) that form the first magnetic flux transmission unit 20, and the second engagement parts 35 and 36 are formed on all of the second thin boards 31 (i.e., on all of the 12 sheets) that form the second magnetic flux transmission unit 30. Therefore, both of two air gaps, i.e., an air gap between the first engagement part 25 and the second engagement part 35 and an air gap between the first engagement part 26 and the second engagement part 36 are small, and a sum total of the area sizes of opposing faces of the first engagement part 25 and the second engagement part 35 and a sum total of the area sizes of opposing faces of the first engagement part 26 and the second engagement part 36 are both large. Therefore, the magnetic flux flowing through the air gap between the first engagement part 25 and the second engagement part 35 and through the air gap between the first engagement part 26 and the second engagement part 36 increases, thereby possibly reducing the spill magnetic flux flowing through the gap space 101. When the spill magnetic flux flowing through the gap space 101 is reduced, deteriorated position detection accuracy may result.

On the other hand, in the third embodiment, the first engagement part 25 and 26 is formed on some (i.e., three) of the multiple first thin boards 21 that form the first magnetic flux transmission unit 20, and the second engagement part 35 and 36 is formed on some (i.e., three) of the multiple second thin boards 31 that form the second magnetic flux transmission unit 30. Therefore, a sum total of the area sizes of the opposing faces of the first engagement part 25 and the second engagement part 35 and a sum total of the area sizes of the opposing faces of the first engagement part 26 and the second engagement part 36 are both reduced. In such manner, the positions of the first/second magnets 41, 42 are determined by the first engagement part 25 and 26 and the second engagement part 35 and 36, while preventing a reduction of the spill magnetic flux flowing through the gap space 101.

In the present embodiment, the cost of the components is reduced in comparison to the second embodiment, by forming the first engagement parts 25 and 26 and the second engagement parts 35 and 36 only on some of the multiple first thin boards 21 and the second thin boards 31.

Further, in the present embodiment, even though the shape of a part at the proximity of the first/second engagement parts 25, 26, 35, 36 is complex in comparison to the second embodiment, such a complex shape of the first/second magnetic flux transmission units 20, 30 is easily made simply by laminating/stacking the first/second thin boards 21, 31.

(Fourth Embodiment)

The position sensing device in the fourth embodiment of the present disclosure is described with reference to FIGS. 8A/B/C/D. The fourth embodiment differs from the second embodiment, in terms of an addition of a new component.

In the fourth embodiment, a first nonmagnetic part 60 and a second nonmagnetic part 70 are provided.

The first nonmagnetic part 60 is formed with the nonmagnetic material in a corresponding shape to the shape of the first thin board 21. According to the present embodiment, the first nonmagnetic part 60 is fixedly attached onto the first magnetic flux transmission unit 20 on one side and on the other side of the first magnetic flux transmission unit 20, the first magnet 41, and the second magnet 42 (i.e., on both sides in the board thickness direction of the unit 20).

The first nonmagnetic part 60 has a main part 62, extender parts 63, 64 and the like. The main part 62 has a corresponding shape that corresponds to a shape of the main part 22 of the first thin board 21. The extender part 63 extends from one end of the main part 62, and has a substantially corresponding shape that corresponds to a shape of the extender part 23. The extender part 63 has a tip part that is positioned on one side in the board thickness direction of the first thin board 21 relative to the first magnet 41, or on the other side of the board 21 relative to the first magnet 41. The extender part 64 extends from the other end of the main part 62, and has a substantially corresponding shape that corresponds to a shape of the extender part 24. The extender part 64 has a tip part that is positioned on one side in the board thickness direction of the first thin board 21 relative to the second magnet 42, or on the other side to the board 21 relative to the second magnet 42.

The first nonmagnetic part 60 has (i) a concave region 601 that recedes from one surface of the first nonmagnetic part 60 in the board thickness direction and (ii) a convex region 602 that protrudes from the other surface of the first nonmagnetic part 60 in the board thickness direction and has a corresponding shape of the concave region 601 at a position corresponding to the concave region 601. The concave region 601 and the convex region 602 are formed in the extender parts 63 and 64. One of the two first nonmagnetic parts 60 is fixed onto the first magnetic flux transmission unit 20 so that the convex region 602 engages with the first concave region 211 of the first thin board 21. The other one of the two first nonmagnetic parts 60 is fixed onto the first magnetic flux transmission unit 20 so that the concave region 601 engages with the first convex region 212 of the first thin board 21.

The second nonmagnetic part 70 has a main part 72, extender parts 73, 74 and the like. The main part 72 has a corresponding shape that corresponds to a shape of the main part 32 of the second thin board 31. The extender part 73 extends from one end of the main part 72, and has a substantially corresponding shape that corresponds to a shape of the extender part 33. The extender part 73 has a tip part that is positioned on one side in the board thickness direction of the second thin board 31 relative to the first magnet 41, or on the other side of the board 31 relative to the first magnet 41. The extender part 74 extends from the other end of the main part 72, and has a substantially corresponding shape corresponds to a shape of the extender part 34. The extender part 74 has a tip part that is positioned on one side in the board thickness direction of the second thin board 31 relative to the second magnet 42, or on the other side of the board 31 relative to the second magnet 42.

The second nonmagnetic part 70 has (i) a concave region 701 that recedes from one surface of the second nonmagnetic part 70 in the board thickness direction and (ii) a convex region 702 that protrudes from the other surface of the second nonmagnetic part 70 in the board thickness direction has a corresponding shape of the concave region 701 at a position corresponding to the concave region 701. The concave region 701 and the convex region 702 are formed on the extender parts 73 and 74. One of the two second nonmagnetic parts 70 is fixed onto the second magnetic flux transmission unit 30 so that the convex region 702 engages with the second concave region 311 of the second thin board 31. The other one of the two second nonmagnetic parts 70 is fixed onto the second magnetic flux transmission unit 30 so that the concave region 701 engages with the second convex part 312 of the second thin board 31.

According to the present embodiment, the first nonmagnetic part 60 and the second nonmagnetic part 70 are formed in a ring shape, by the connection between the tip part of the extender part 63 and the tip part of the extender part 73, and by the connection between the tip part of the extender part 64 and the tip part of the extender part 74. Therefore, the first nonmagnetic part 60 and the second nonmagnetic part 70 may be formed by press-process or the like of one sheet of a thin board of a nonmagnetic material of one sheet, for example.

In the present embodiment, as a manufacturing method of a magnetic circuit component, (i) firstly laminating/stacking and fixing the first thin boards 21, the second thin boards 31, the first nonmagnetic part 60, and the second nonmagnetic part 70 to have one body, and (ii) inserting the first magnet 41 into a space in between the extender part 23 and the extender part 33 and inserting the second magnet 42 into a space in between the extender part 24 and the extender part 34 may be considered.

As mentioned above, in the present embodiment the first nonmagnetic part 60 has the extender part 63 with its tip part positioned on one or the other side in the board thickness direction of the first thin board 21 relative to the first magnet 41, and has the extender part 64 with its tip part positioned on one or the other side in the board thickness direction of the first thin board 21 relative to the second magnet 42. Further, the second nonmagnetic part 70 has the extender part 73 with its tip part positioned on one or the other side in the board thickness direction of the second thin board 31 relative to the first magnet 41, and has the extender part 74 with its tip part positioned on one or the other side in the board thickness direction of the second thin board 31 relative to the second magnet 42. Therefore, by holding the first and second magnets 41, 42 in an engaging manner with the extender parts 63, 64, 73, 74, a movement of the first and second magnets 41, 42 in the board thickness direction of the first thin board 21 and the second thin board 31 relative to the first magnetic flux transmission unit 20 and the second magnetic flux transmission unit 30 is regulated.

Further, in the present embodiment, since the first nonmagnetic part 60 and the second nonmagnetic part 70 are respectively formed in one piece, the magnetic circuit components including the first magnetic flux transmission unit 20, the second magnetic flux transmission unit 30, the first magnet 41, and the second magnet 42 are integrated to have a single body. Further, by fixing the positions of the first magnet 41 and the second magnet 42 relative to the first magnetic flux transmission unit 20 and the second magnetic flux transmission unit 30, in comparison to the second embodiment in which the positions of the first magnet 41 and the second magnet 42 are not fixed, performance variation among individual products is reduced.

Further, in the second embodiment in which the positions of the first magnet 41 and the second magnet 42 are not fixed, during an insert molding of the magnetic circuit component onto the rotating body 12, the first magnet 41 and the second magnet 42 may stick to a mold when it is made of a magnetic material, and sticking of the magnets 41, 42 to the mold may cause a cracking and/or nicking and the like of those magnets. On the other hand, in the fourth embodiment, since the first magnet 41 and the second magnet 42 are disposed in a space that is surrounded by the first magnetic flux transmission unit 20, the second magnetic flux transmission unit 30, the first nonmagnetic part 60, and the second nonmagnetic part 70, sticking of the first magnet 41 and the second magnet 42 to the mold is prevented. Therefore, cracking and/or nicking of the first magnet 41 and the second magnet 42 is prevented. Further, a cycle time concerning an installation of the magnetic circuit components in the mold is reduced.

(Fifth Embodiment)

Figure 9A:
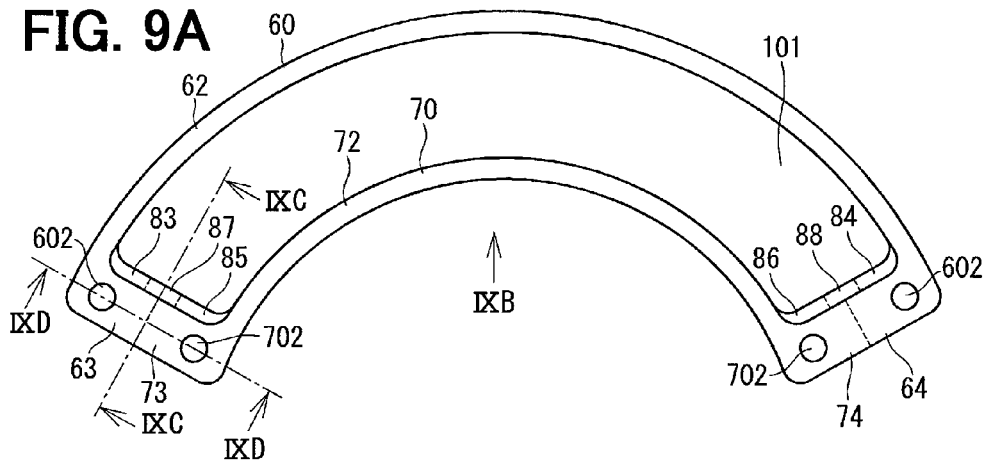
FIG. 9A is a plan view of the magnetic circuit component of the position sensing device according to a fifth embodiment of the present disclosure.
Figure 10A:
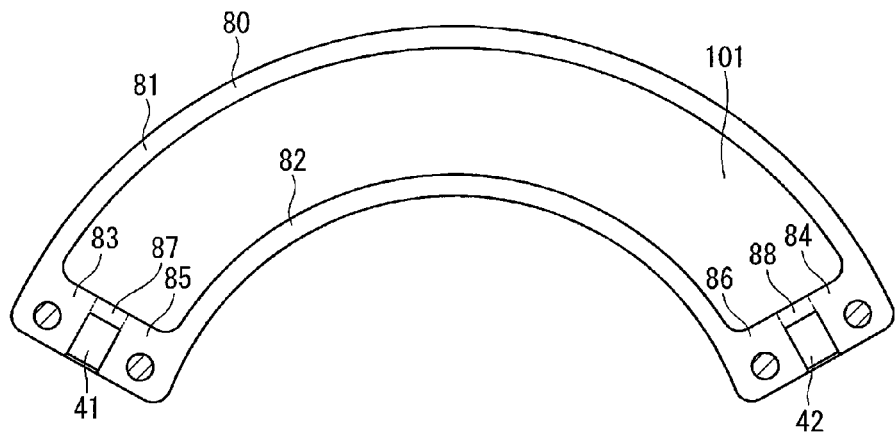
FIG. 10A is a XA-XA line sectional view of FIG. 9B.
Figure 10B:
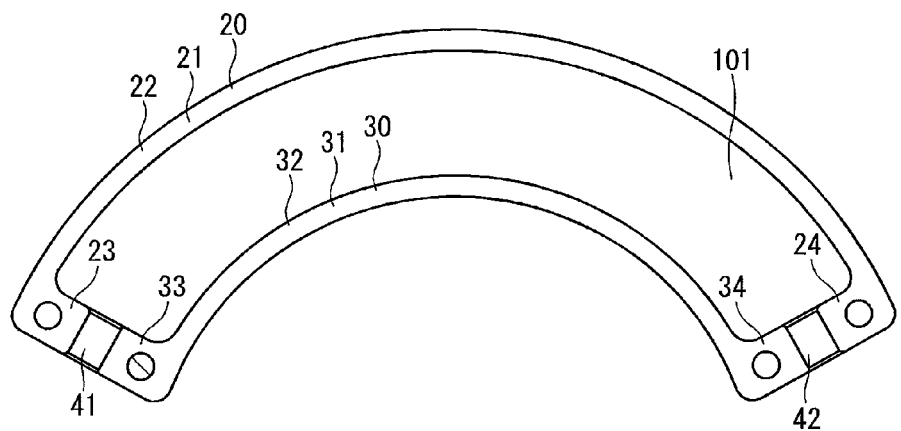
FIG. 10B is a sectional view along a XB-XB line of FIG. 9B.
Figure 10C:
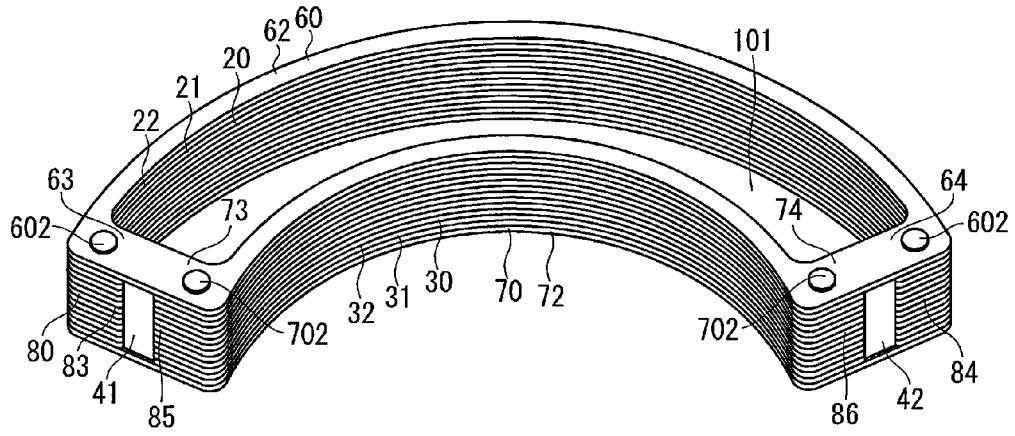
FIG. 10C is a perspective view of the magnetic circuit component.

The position sensing device in the fifth embodiment of the present disclosure is described with reference to FIGS. 9A/B/C/D and FIGS. 10A/B/C. The fifth embodiment differs from the fourth embodiment in the shape of the first magnetic flux transmission unit and the second magnetic flux transmission unit, in which the two units have a new component and the like. According to the fifth embodiment, the first thin board 21 and the second thin board 31 do not have the first engagement parts 25 and 26 and the second engagement parts 35 and 36.

According to the fifth embodiment, a middle nonmagnetic part 80 is further provided.

The middle nonmagnetic part 80 is made of the nonmagnetic material similar to the first nonmagnetic part 60 and the second nonmagnetic part 70. As shown in FIG. 10A, the middle nonmagnetic part 80 has main parts 81 and 82, extender parts 83, 84, 85, and 86, middle nonmagnetic engagement parts 87, and 88 and the like.

The main part 81 is formed in a corresponding shape that corresponds to the shape of the main part 22 of the first thin board 21. The main part 82 is formed in a corresponding shape that corresponds to the shape of the main part 32 of the second thin board 31. The extender part 83 extends from one end of the main part 81, and has a substantially corresponding shape that corresponds to a shape of the extender part 23. The extender part 84 extends from the other end of the main part 81, and has a substantially corresponding shape that corresponds to a shape of the extender part 24. The extender part 85 extends from one end of the main part 82, and has a substantially corresponding shape that corresponds to a shape of the extender part 33. The extender part 86 extends from the other end of the main part 82, and has a substantially corresponding shape that corresponds to a shape of the extender part 34.

A middle nonmagnetic engagement part 87 is formed so that a tip part of the extender part 83 and a tip part of the extender part 85 may be connected. A middle nonmagnetic engagement part 88 is formed so that a tip part of the extender part 84 and a tip part of the extender part 86 may be connected. Thereby, the middle nonmagnetic part 80 is formed in a ring shape. Therefore, the middle nonmagnetic part 80 may be formed by a press process or the like of one thin board that is made of a nonmagnetic material, for example.

Figure 9B:
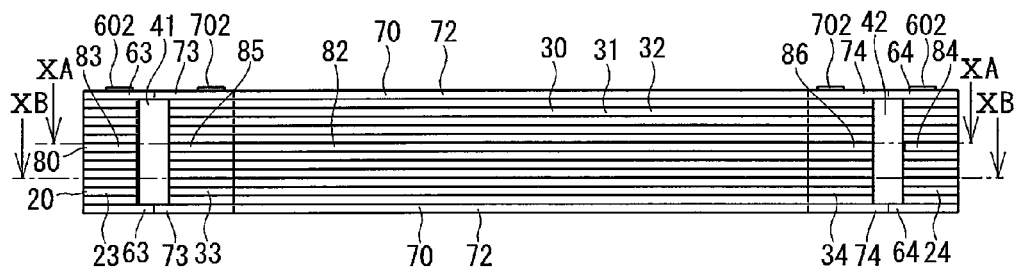
FIG. 9B is a view of the component of FIG. 9A in an arrow B direction according to the fifth embodiment of the present disclosure.
Figure 9C:
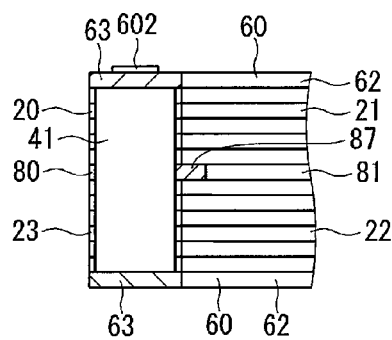
FIG. 9C is a sectional view along a IXC-IXC line of FIG. 9A according to the fifth embodiment of the present disclosure.
Figure 9D:
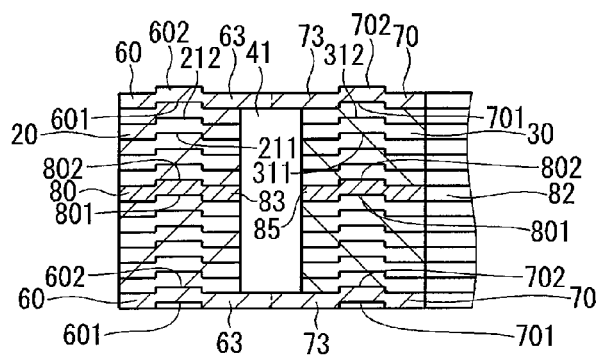
FIG. 9D is a sectional view along a IXD-IXD line of FIG. 9A according to the fifth embodiment of the present disclosure.

The middle nonmagnetic part 80 is, as shown in FIGS. 9B/C/D, positioned substantially in the middle of the stack of the multiple first thin boards 21 and the multiple second thin boards 31 which are laminated/stacked with each other. More practically, the middle nonmagnetic part 80 is, on one side (i.e., on a part 81 side), bound by 5 sheets of the first thin board 21 and 6 sheets of the first thin board 21 in the board thickness direction, and, on the other side (i.e., on a part 82 side), bound by 5 sheets of the second thin board 22 and 6 sheets of the second thin board 22 in the board thickness direction.

Here, the middle nonmagnetic engagement part 87 is formed on one side of the first magnet 41 close to the second magnet 42 (i.e., the "other" side of the gap space 101 in the longitudinal direction). Further, the middle nonmagnetic engagement part 88 is formed on one side of the second magnet 42 close to the first magnet 41 (i.e., on "one" side of the gap space 101 in the longitudinal direction).

The middle nonmagnetic part 80 has (i) a concave region 801 that recedes from one surface of the middle nonmagnetic part 80 in the board thickness direction and (ii) a convex region 802 that projects from the other surface of the middle nonmagnetic part 80 in the board thickness direction, in a corresponding shape of the concave region 801 at a position corresponding to the concave region 801. The concave region 801 and the convex region 802 are formed on the extender parts 83, 84, 85, and 86. The middle nonmagnetic part 80 is disposed so that the concave regions 801 engage with the first convex region 212 of the first thin board 21 and the second convex region 312 of the second thin board 31 and the convex regions 802 engages with the first concave region 211 of the first thin board 21 and the second concave region 311 of the second thin board 31, to be formed to have one body with the first magnetic flux transmission unit 20 and the second magnetic flux transmission unit 30.

In the present embodiment, as a manufacturing method of a magnetic circuit component, (i) firstly laminating/stacking and fixing the first thin boards 21, the second thin boards 31, the middle nonmagnetic part 80, the first nonmagnetic part 60, and the second nonmagnetic part 70 to have one body, and (ii) inserting the first magnet 41 into a space in between the extender parts 23, 83, 33, 85 and inserting the second magnet 42 into a space in between the extender parts 24, 84, 34, 86 may be considered.

As mentioned above, in the present embodiment, the middle nonmagnetic part 80 has the middle nonmagnetic engagement part 87 positioned on one side of the first magnet 41 close to the second magnet 42 (i.e., on the "other" side in the longitudinal direction of the gap space 101), and has the middle nonmagnetic engagement part 88 positioned on one side of the second magnet 42 close to the first magnet 41 (i.e., on "one" side in the longitudinal direction of the gap space 101. Therefore, by holding the first and second magnets 41, 42 in an engaging manner with the middle nonmagnetic engagement parts 87 and 88, a movement of the magnets 41, 42 in the longitudinal direction of the gap space 101 relative to the first magnetic flux transmission unit 20 and the second magnetic flux transmission unit 30 is regulated.

In the above-mentioned second and third embodiments, the magnetic flux flowing in (i) the air gap between the first engagement part 25 and the second engagement part 35 and (ii) the air gap between the first engagement part 26 and the second engagement part 36 increases, which possibly causes a decrease of the spill magnetic flux flowing spilling into the gap space 101, because the first engagement part 25 and 26 and the second engagement part 35 and 36 for holding the first magnet 41 and the second magnet 42 are formed on the first thin board 21 and the second thin board 31.

However, in the configuration of the present fifth embodiment, the first magnet 41 and the second magnet 42 are held by the middle nonmagnetic engagement parts 87 and 88 made of the nonmagnetic material, without having the first engagement part 25 and 26 and the second engagement part 35 and 36 made of magnetic bodies. Therefore, without decreasing the spill magnetic flux flowing in the gap space 101, a movement of the first magnet 41 and the second magnet 42 relative to the first magnetic flux transmission unit 20 and the second magnetic flux transmission unit 30 is regulated.

(Sixth Embodiment)

Figure 11A:
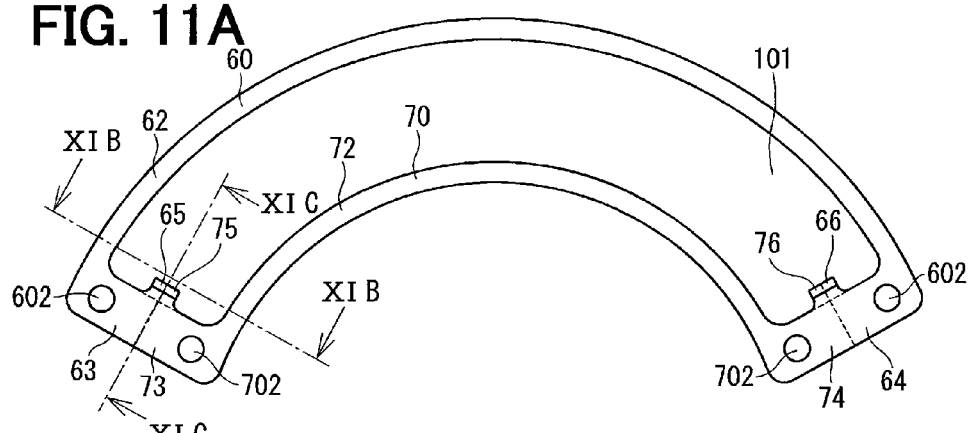
FIG. 11A is a plan view of the magnetic circuit component of the position sensing device according to a sixth embodiment of the present disclosure.
Figure 11B:
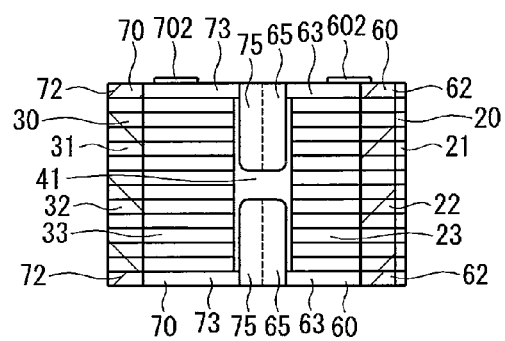
FIG. 11B is a sectional view of the component along a XIB-XIB line of FIG. 11A according to the sixth embodiment of the present disclosure.
Figure 11C:
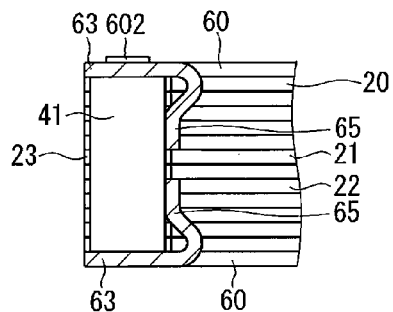
FIG. 11C is a sectional view along a XIC-XIC line of FIG. 11A according to the sixth embodiment of the present disclosure.
Figure 11D:
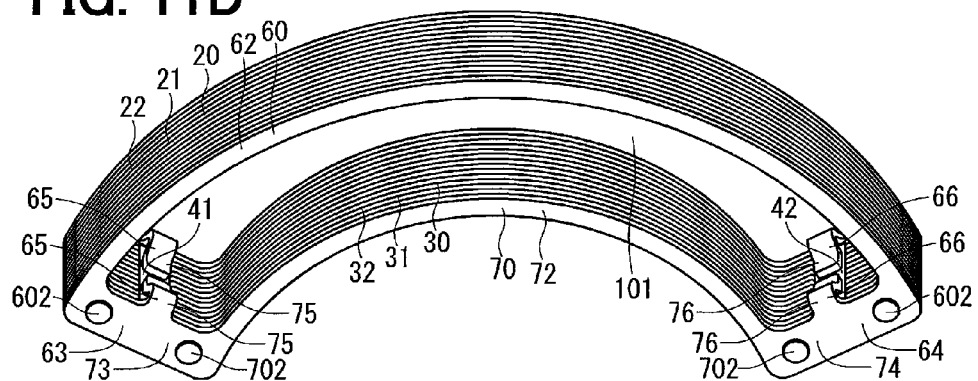
FIG. 11D is a perspective view of the magnetic circuit component according to the sixth embodiment of the present disclosure.

The position sensing device in the fourth embodiment of the present disclosure is described with reference to FIGS. 11A/B/C/D. The sixth embodiment differs in the shape of the first magnetic flux transmission unit, the second magnetic flux transmission unit, the first nonmagnetic part, and the second nonmagnetic part, etc. from the fourth embodiment.

According to the sixth embodiment, the first thin board 21 and the second thin board 31 do not have the first engagement part 25 and 26 and the second engagement part 35 and 36.

The first nonmagnetic part 60 has first nonmagnetic engagement parts 65 and 66. The first nonmagnetic engagement part 65 extends from a tip part of the extender part 63 of the first nonmagnetic part 60, and is positioned on one side of the first magnet 41 close to the second magnet 42 (i.e., on the "other" side in the longitudinal direction of the gap space 101). The first nonmagnetic engagement part 66 extends from a tip part of the extender part 64 of the first nonmagnetic part 60, and is positioned on one side of the second magnet 42 close to the first magnet 41 (i.e., on "one" side in the longitudinal direction of the gap space 101). The first nonmagnetic engagement parts 65 and 66 may be formed by a bending process of a material that is used to form the first nonmagnetic part 60, for example.

The second nonmagnetic part 70 has second nonmagnetic engagement parts 75 and 76. The second nonmagnetic engagement part 75 extends from a tip part of the extender part 73 of the second nonmagnetic part 70, and is positioned on one side of the first magnet 41 close to the second magnet 42 (i.e., on the "other" side in the longitudinal direction of the gap space 101). The second nonmagnetic engagement part 76 extends from a tip part of the extender part 74 of the second nonmagnetic part 70, and is positioned on one side of the second magnet 42 close to the first magnet 41 (i.e., on "one" side in the longitudinal direction of the gap space 101). The second nonmagnetic engagement parts 75 and 76 may be formed by a bending process of a material that is used to form the second nonmagnetic part 70, for example.

Here, the first nonmagnetic engagement part 65 and the second nonmagnetic engagement part 75 are formed to have one body. Further, the first nonmagnetic engagement part 66 and the second nonmagnetic engagement part 76 are formed to have one body.

In the present embodiment, as a manufacturing method of a magnetic circuit component, (i) firstly laminating/stacking and fixing the first thin boards 21, the second thin boards 31, the first nonmagnetic part 60, and the second nonmagnetic part 70 to have one body, and then (ii) inserting the first magnet 41 into a space in between the extender part 23 and the extender part 33 and inserting the second magnet 42 into a space in between the extender part 24 and the extender part 34 may be considered.

As mentioned above, in the present embodiment, the first nonmagnetic part 60 and the second nonmagnetic part 70 are formed to have the first nonmagnetic engagement part 65 and the second nonmagnetic engagement part 75 respectively positioned on one side of the first magnet 41 close to the second magnet 42 (i.e., on the "other" side in the longitudinal direction of the gap space 101), and to have the first nonmagnetic engagement part 66 and the second nonmagnetic engagement part 76 respectively positioned on one side of the second magnet 42 close to the first magnet 41 (i.e., on "one" side in the longitudinal direction of the gap space 101). Therefore, by engagingly holding the first magnet 41 and the second magnet 42 with the first nonmagnetic engagement parts 65 and 66 and the second nonmagnetic engagement parts 75 and 76, a movement of the first magnet 41 and the second magnet 42 in the longitudinal direction of the gap space 101 relative to the first magnetic flux transmission unit 20 and the second magnetic flux transmission unit 30 is regulated.

In the sixth embodiment, the first engagement parts 25 and 26 and the second engagement parts 35 and 36 made of the magnetic body are not used. That is, by using the first nonmagnetic engagement parts 65 and 66 and the second nonmagnetic engagement parts 75 and 76, all of which are made of a nonmagnetic material, for engagingly holding the first magnet 41 and the second magnet 42, a movement of the first magnet 41 and the second magnet 42 relative to the first magnetic flux transmission unit 20 and the second magnetic flux transmission unit 30 is regulated without reducing the spill magnetic flux flowing through the gap space 101.

(Seventh Embodiment)

Figure 12A:
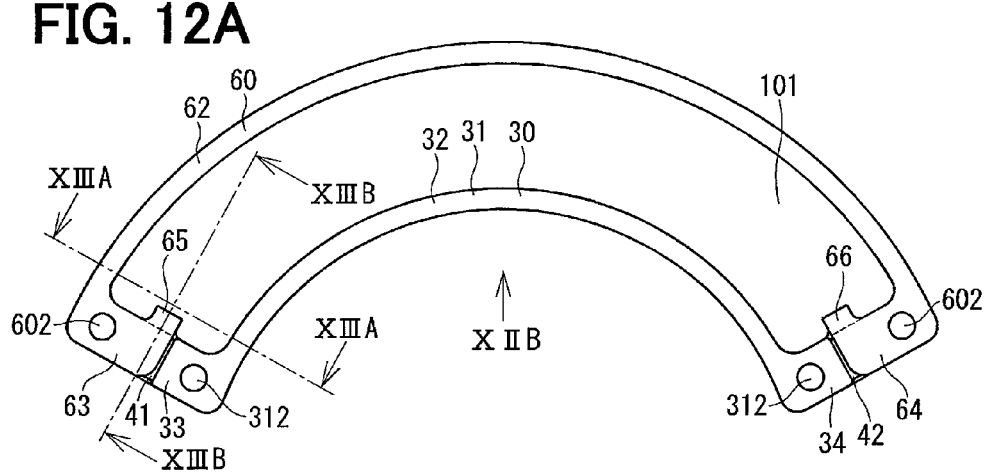
FIG. 12A is a plan view of the magnetic circuit component of the position sensing device according to a seventh embodiment of the present disclosure.
Figure 12B:
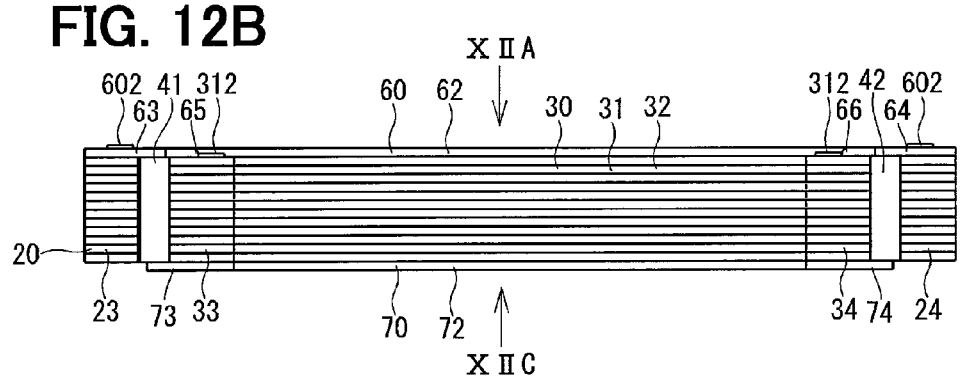
FIG. 12B is a view of the component of FIG. 12A in an arrow B direction according to the seventh embodiment of the present disclosure.
Figure 12C:
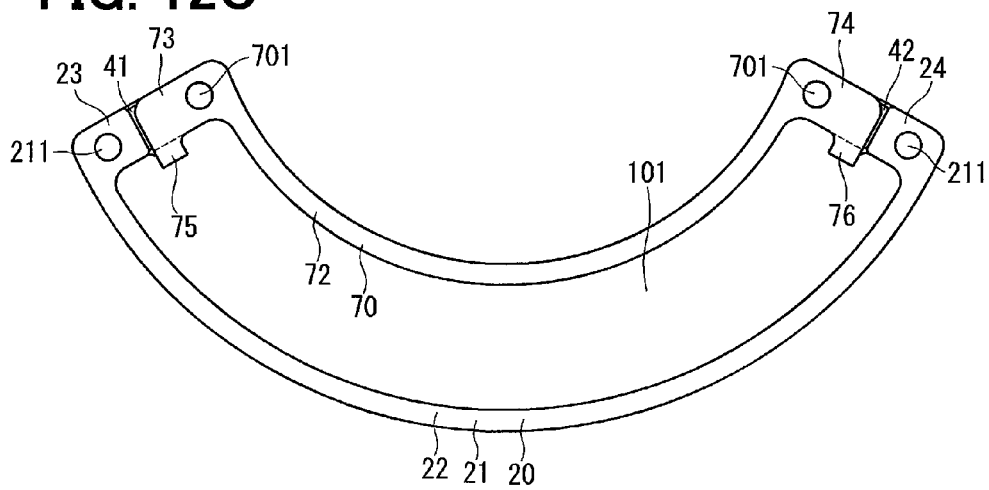
FIG. 12C is a view of the component of FIG. 12B in an arrow C direction according to the seventh embodiment of the present disclosure.
Figure 13A:
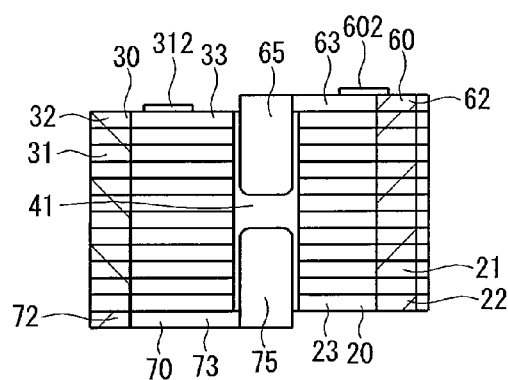
FIG. 13A is a sectional view of the component along a XIIIA-XIIIA line of FIG. 12A.
Figure 13B:
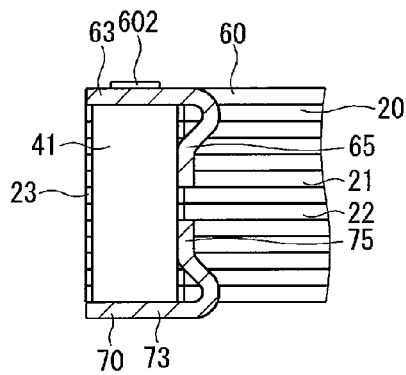
FIG. 13B is a sectional view along a XIIIB-XIIIB line of FIG. 12A.

The position sensing device in the seventh embodiment of the present disclosure is described with reference to FIGS. 12A/B/C and FIGS. 13A/B/C. Compared to the sixth embodiment, the seventh embodiment differs in the shape of the first nonmagnetic part and the second nonmagnetic part, etc.

According to the seventh embodiment, the first nonmagnetic part 60 and the second nonmagnetic part 70 are formed to have separate bodies.

The first nonmagnetic part 60 is disposed only on one side in the board thickness direction of the first thin board 21, i.e., on one side of the first magnetic flux transmission unit 20, the first magnet 41, and the second magnet 42. That is, the first nonmagnetic part 60 is attached to an upper side of the first magnetic flux transmission unit 20. The first nonmagnetic engagement part 65 extends from a tip part of the extender part 63, and is positioned on one side of the first magnet 41 close to the second magnet 42 (i.e., on the "other" side of the gap space 101 in the longitudinal direction). The first nonmagnetic engagement part 66 extends from a tip part of the extender part 64, and is positioned on one side of the first magnet 41 close to the second magnet 42 (i.e., on the "other" side of the gap space 101 in the longitudinal direction).

The second nonmagnetic part 70 is disposed only on one side in the board thickness direction of the second thin board 31, i.e., on the other side of the first magnetic flux transmission unit 20, the first magnet 41, and the second magnet 42. That is, the second nonmagnetic part 70 is attached to a lower side of the first magnetic flux transmission unit 20. The second nonmagnetic engagement part 75 extends from a tip part of the extender part 73, and is positioned on one side of the first magnet 41 close to the second magnet 42 (i.e., on the "other" side of the gap space in the longitudinal direction). The second nonmagnetic engagement part 76 extends from a tip part of the extender part 74, and is positioned on one side of the first magnet 41 close to the second magnet 42 (i.e., on the "other" side of the gap space 101 in the longitudinal direction).

Figure 13C:
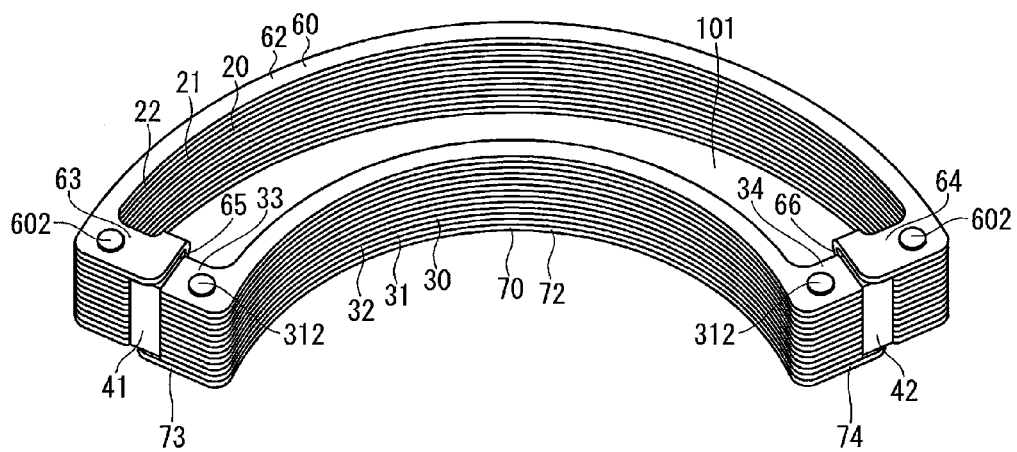
FIG. 13C is a perspective view of the magnetic circuit component.

As shown in FIG. 13C, the first magnetic flux transmission unit 20 (i.e., the first nonmagnetic part 60) and the second magnetic flux transmission unit 30 (i.e., the second nonmagnetic part 70) stick (i.e., attach) to the first magnet 41 and the second magnet 42 by the magnetic force of the first magnet 41 and the second magnet 42 in a pre-assembly state before being assembled as the rotating body 12. Thereby, the first magnetic flux transmission unit 20, the second magnetic flux transmission unit 30, the first magnet 41, and the second magnet 42 (i.e., the magnetic circuit components) are unified (i.e., mutually attached).

In the present embodiment, as a manufacturing method of a magnetic circuit component, the first thin boards 21 and the first nonmagnetic part 60 may be laminated/stacked and fixed first, and the second thin boards 31 and the second nonmagnetic part 70 may be laminated/stacked and fixed, and the first magnetic flux transmission unit 20 (i.e., the first nonmagnetic part 60), the second magnetic flux transmission unit 30 (i.e., the second nonmagnetic part 70), the first magnet 41, and the second magnet 42 may be unified by the magnetic force of the first magnet 41 and the second magnet 42 to have one body.

According to the fourth to sixth embodiments mentioned above, the size of the gap space between the extender parts 23, 24 and the extender parts 33 and 34 is fixed according to a one body structure/configuration of the first nonmagnetic part 60 and the second nonmagnetic part 70. Therefore, it is necessary to strictly define (i.e., set) the size (i.e., the dimension in the magnetized direction) of the first magnet 41 and the second magnet 42 and the size of the air gap space.

On the other hand, in the seventh embodiment, the first magnetic flux transmission unit 20 (i.e., the first nonmagnetic part 60), the second magnetic flux transmission unit 30 (i.e., the second nonmagnetic part 70), the first magnet 41, and the second magnet 42 (i.e., the magnetic circuit components) are unified in one body by the magnetic force of the first magnet 41 and the second magnet 42. Therefore, it is not necessary to strictly define the size (i.e., the dimension in the magnetized direction) of the first magnet 41 and the second magnet 42 and the size of the air gap space.

Further, in the present embodiment, a movement of the first magnet 41 and the second magnet 42 in the board thickness direction relative to the first magnetic flux transmission unit 20 and the second magnetic flux transmission unit 30 is regulated by the extender parts 63 and 64 of the first nonmagnetic part 60 and the extender parts 73 and 74 of the second nonmagnetic part 70. Further, a movement of the first magnet 41 and the second magnet 42 in the longitudinal direction of the gap space 101 relative to the first magnetic flux transmission unit 20 and the second magnetic flux transmission unit 30 is regulated by the first nonmagnetic engagement parts 65 and 66 of the first nonmagnetic part 60 and the second nonmagnetic engagement parts 75 and 76 of the second nonmagnetic part 70.

(Eighth Embodiment)

Figure 14A:
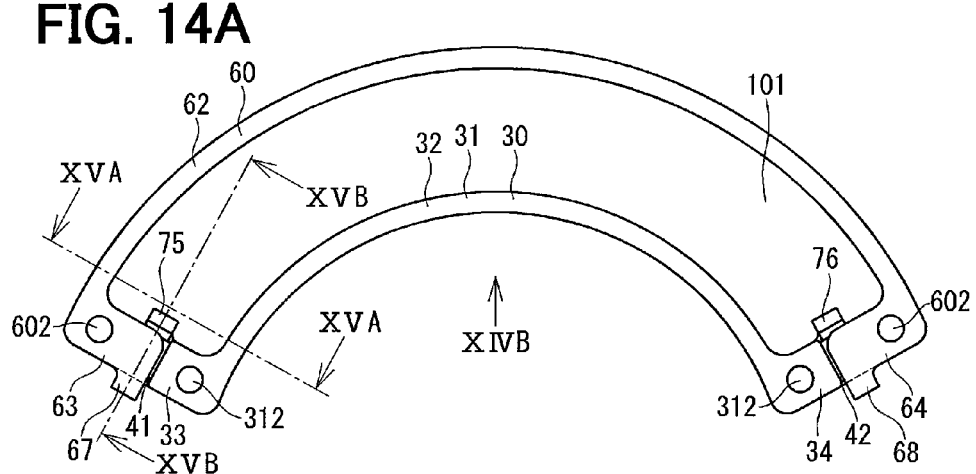
FIG. 14A is a plan view of the magnetic circuit component of the position sensing device according to an eighth embodiment of the present disclosure.
Figure 14B:
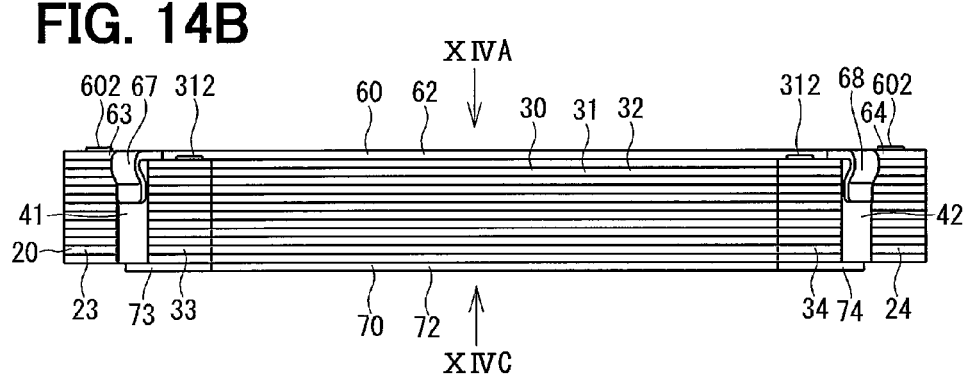
FIG. 14B is a view of the component of FIG. 14A in an arrow B direction according to the eighth embodiment of the present disclosure.
Figure 14C:
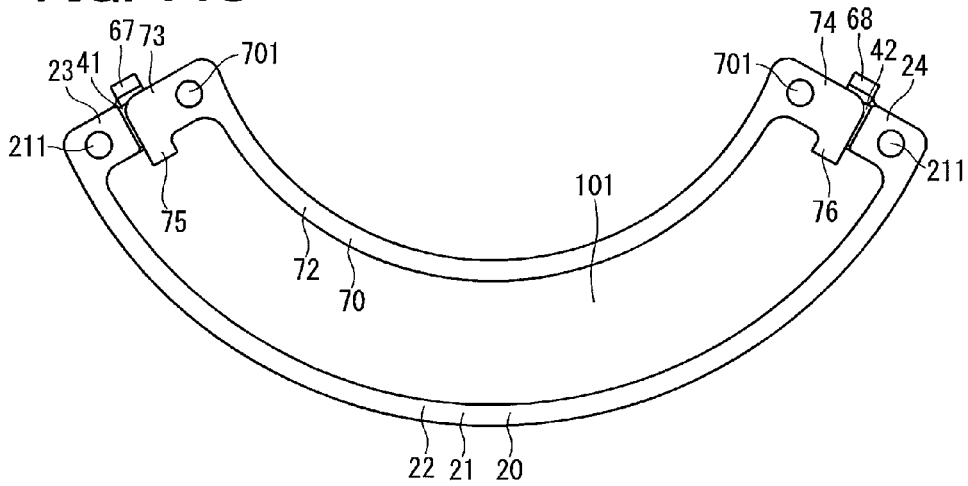
FIG. 14C is a view of the component of FIG. 14B in an arrow C direction according to the eighth embodiment of the present disclosure.
Figure 15A:
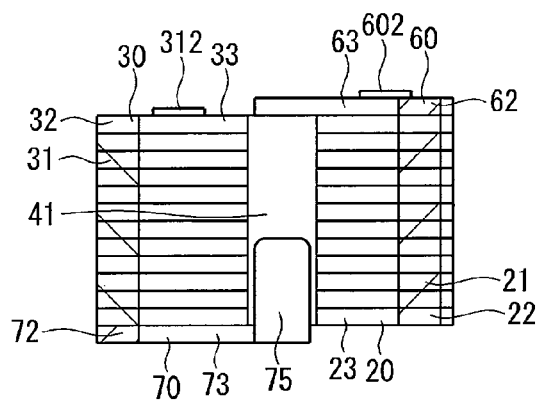
FIG. 15A is a sectional view of the component along a XVA-XVA line of FIG. 14A.
Figure 15B:
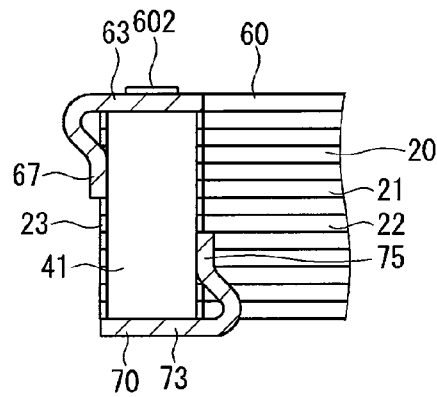
FIG. 15B is a sectional view along a XVB-XVB line of FIG. 13A.
Figure 15C:
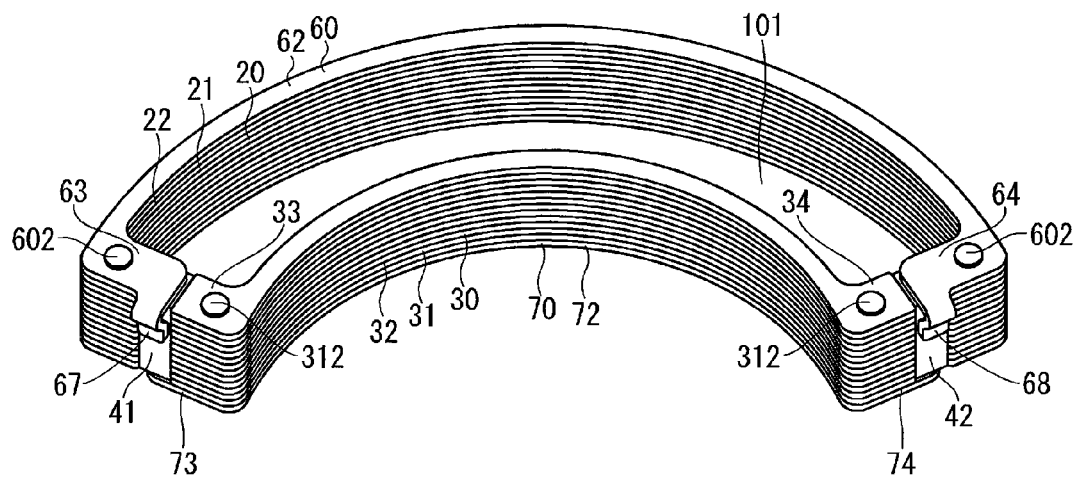
FIG. 15C is a perspective view of the magnetic circuit component.

The position sensing device in the eighth embodiment of the present disclosure is described with reference to FIGS. 14A/B/C and FIGS. 15A/B/C. The eighth embodiment differs in the shape of the first nonmagnetic part from the seventh embodiment.

According to the eighth embodiment, the first nonmagnetic part 60 has, instead of having the first nonmagnetic engagement parts 65 and 66, first nonmagnetic engagement parts 67 and 68.

The first nonmagnetic engagement part 67 extends from a tip part of the extender part 63 of the first nonmagnetic part 60, and is positioned on one side of the first magnet 41 away from the second magnet 42 (i.e., on "one" side of the gap space 101 in the longitudinal direction). The first nonmagnetic engagement part 68 extends from a tip part of the extender part 64 of the first nonmagnetic part 60, and is positioned on one side of the second magnet 42 away from the first magnet 41 (i.e., on the "other" side of the gap space 101 in the longitudinal direction). The first nonmagnetic engagement parts 67 and 68 may be formed by a bending process of the same material that is used to form the first nonmagnetic part 60, for example.

The present embodiment has the same configuration as the seventh embodiment other than the above-mentioned parts.

According to the present embodiment, a movement of the first magnet 41 and the second magnet 42 in the longitudinal direction of the gap space 101 relative to the first magnetic flux transmission unit 20 and the second magnetic flux transmission unit 30 is securely regulated by the first nonmagnetic engagement parts 67 and 68 and the second nonmagnetic engagement parts 75 and 76.

(Ninth Embodiment)

Figure 16A:
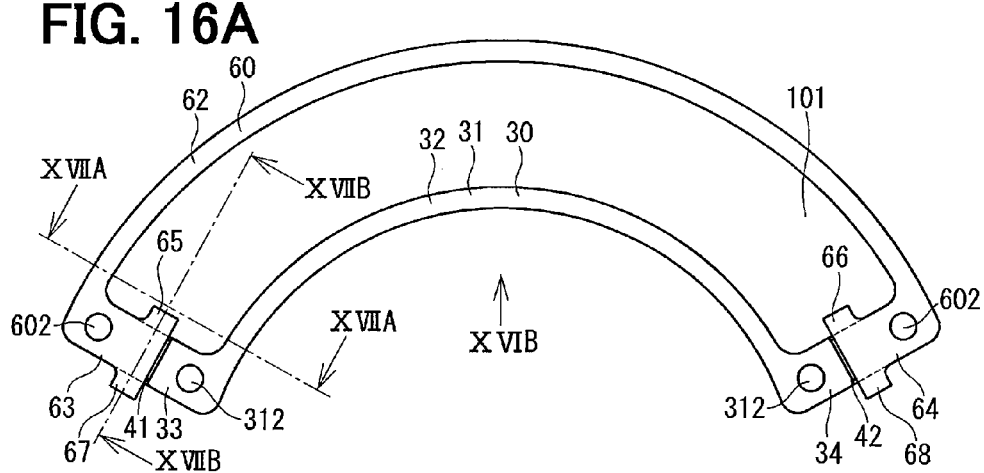
FIG. 16A is a plan view of the magnetic circuit component of the position sensing device according to a ninth embodiment of the present disclosure.
Figure 16B:
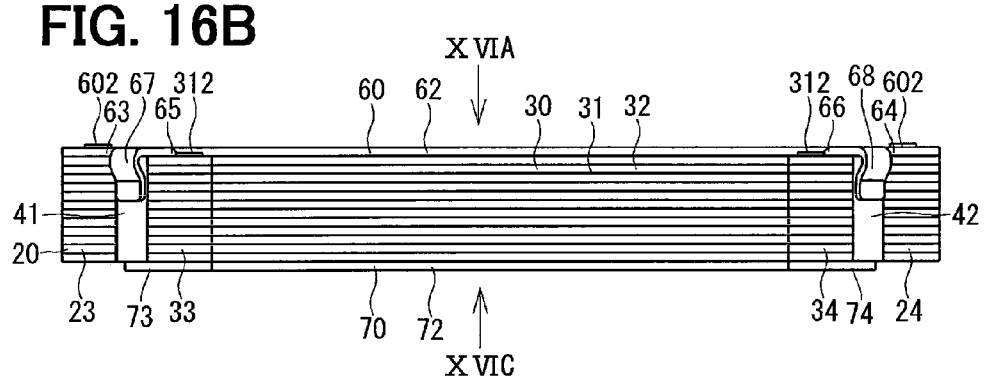
FIG. 16B is a view of the component of FIG. 16A in an arrow B direction according to the ninth embodiment of the present disclosure.
Figure 16C:
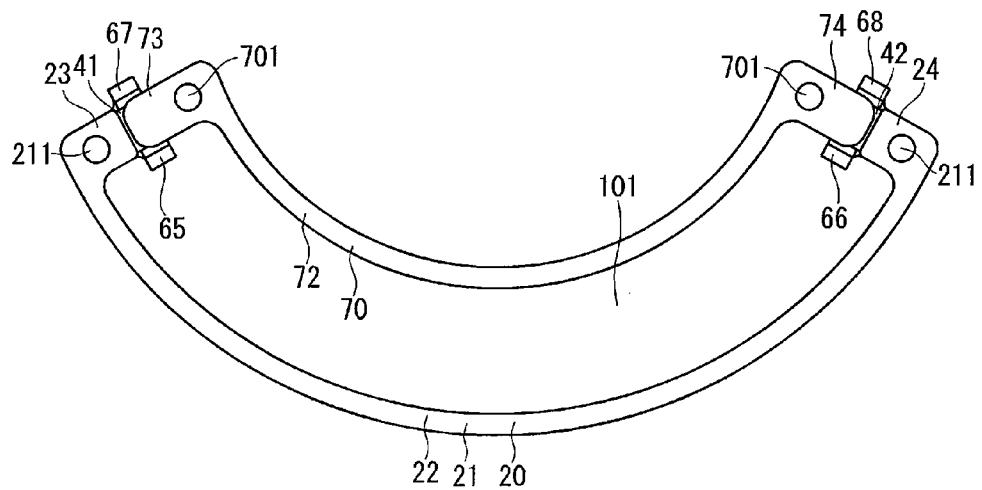
FIG. 16C is a view of the component of FIG. 16B in an arrow C direction according to the ninth embodiment of the present disclosure.
Figure 17A:
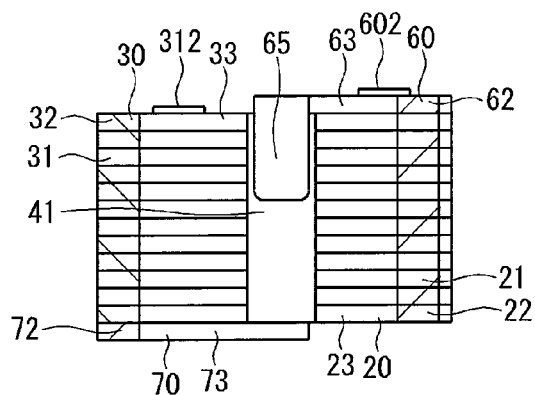
FIG. 17A is a sectional view of the component along a XVIIA-XVIIA line of FIG. 16A.
Figure 17B:
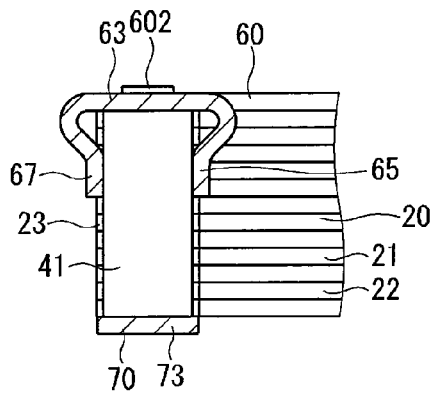
FIG. 17B is a sectional view along a XVIIB-XVIIB line of FIG. 16A.
Figure 17C:
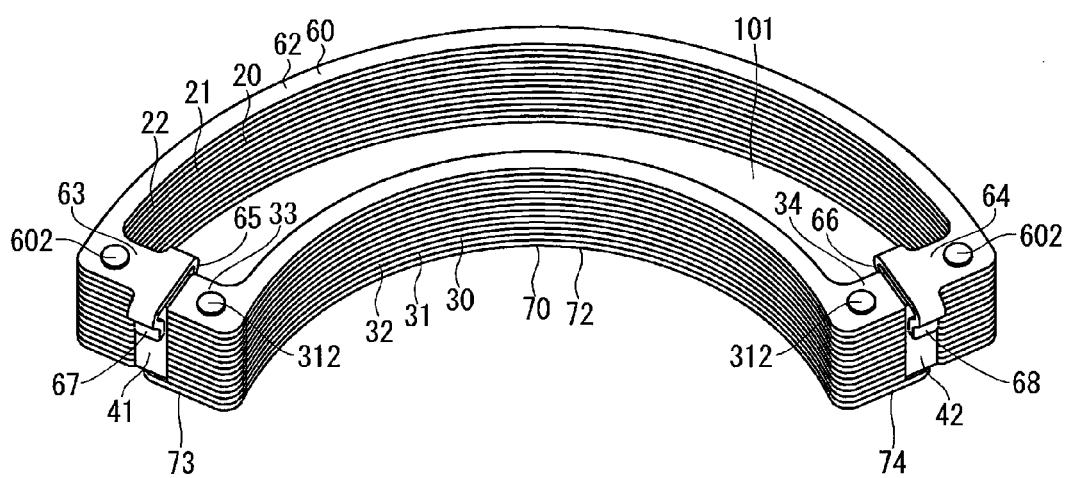
FIG. 17C is a perspective view of the magnetic circuit component.

The position sensing device in the ninth embodiment of the present disclosure is described with reference to FIGS. 16A/B/C and FIGS. 17A/B/C. The ninth embodiment differs in the shape of the first nonmagnetic part and the second nonmagnetic part from the eighth embodiment.

According to the ninth embodiment, the first nonmagnetic part 60 has the first nonmagnetic engagement parts 65 and 66 shown in the seventh embodiment, and the first nonmagnetic engagement parts 67 and 68 shown in the eighth embodiment. The second nonmagnetic part 70 does not have the second nonmagnetic engagement parts 75 and 76.

The present embodiment has the same configuration as the eighth embodiment other than the above-mentioned parts.

In the present embodiment, as a manufacturing method of the magnetic circuit component, the following procedure may be considered. That is, (i) first, the first thin board 21 and the first nonmagnetic part 60 are first laminated/stacked and fixed, and (ii) then, the second thin board 31 and the second nonmagnetic part 70 are laminated/stacked and fixed, and (iii) then, the first magnet 41 is inserted into a space between the first nonmagnetic engagement part 65 and the first nonmagnetic engagement part 67 for the magnet 41 to stick to the extender part 23, and (iv) then, the second magnet 42 is inserted into a space between the first nonmagnetic engagement part 66 and the first nonmagnetic engagement part 68 for the magnet 42 to stick to the extender part 24, and (v) then, the first magnet 41 is made to stick to the extender part 33, and (vi) then, the second magnet 42 is made to stick to the extender part 34. In such manner, the first magnetic flux transmission unit 20 (i.e., the first nonmagnetic part 60), the second magnetic flux transmission unit 30 (i.e., the second nonmagnetic part 70), the first magnet 41, and the second magnet 42 are unified and assembled to have one body.

According to the present embodiment, a movement of the first magnet 41 and the second magnet 42 in the longitudinal direction of the gap space 101 relative to the first magnetic flux transmission unit 20 and the second magnetic flux transmission unit 30 is securely regulated by the first nonmagnetic engagement parts 65, 66, 67, and 68.

(Tenth Embodiment)

The position sensing device in the tenth embodiment of the present disclosure is described with reference to FIGS. 18A/B. Compared to the first embodiment, the tenth embodiment differs in the shape of the first magnetic flux transmission unit and the second magnetic flux transmission unit, etc.

Figure 18A:
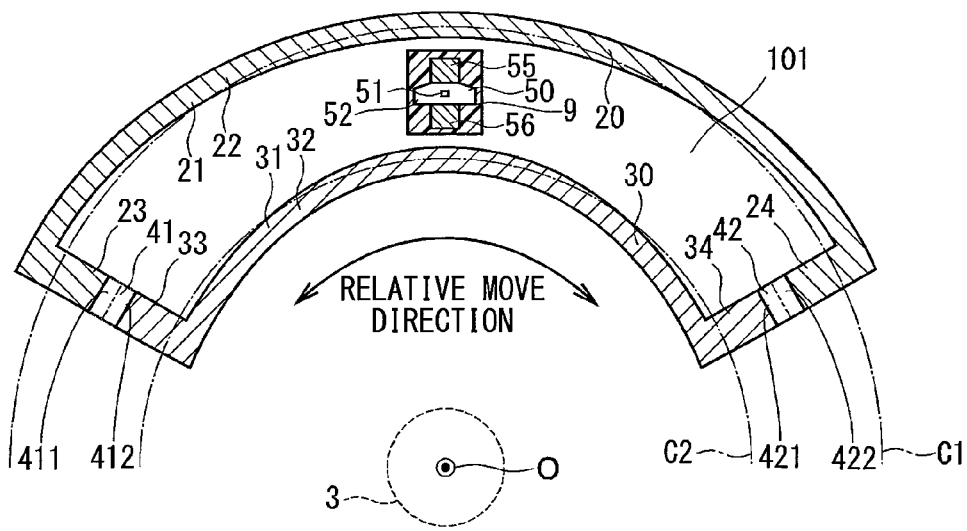
FIG. 18A is an illustration of a proximity of the magnetic circuit component of the position sensing device in a tenth embodiment of the present disclosure.

According to the tenth embodiment, an arc shape of the main part 22 of the first thin board 21 does not fit (i.e., extend along) the first virtual circular arc C1 (see FIG. 18A).

Thereby, the first magnetic flux transmission unit 20 has the first thin board 21 with its both end portions, which are close to the second magnetic flux transmission unit 30, formed to extend along a free curve, or along a combination of multiple arcs. Further, in the present embodiment, the main part 22 is formed to have the same width (i.e., a dimension in the lateral direction) at any position along the longitudinal direction.

An arc shape of the main part 32 of the second thin board 31 does not fit (i.e., extend along) the second virtual circular arc C2 (see FIG. 18A). Thereby, the second magnetic flux transmission unit 30 has the second thin board 22 with its both end portions, which are close to the first magnetic flux transmission unit 20, formed to extend along a free curve, or along a combination of multiple arcs. Further, in the present embodiment, the main part 32 is formed to have the same width (i.e., a dimension in the lateral direction) at any position along the longitudinal direction.

As shown in FIG. 18A, in the present embodiment, the width (i.e., a dimension in the lateral direction) of the gap space 101 is configured to be different at different positions along the longitudinal direction. Therefore, a gap between the main part 22 and the magnetic flux collecting part 55 and a gap between the main part 32 and the magnetic flux collecting part 56 change at different positions along the longitudinal direction of the gap space 101.

Figure 18B:
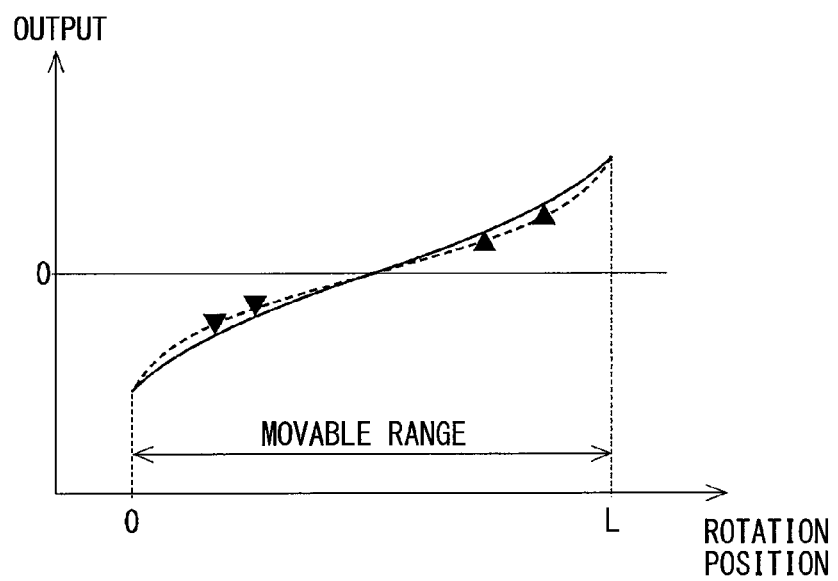
FIG. 18B is a graph of relationship between the output of the Hall IC of the position sensing device and the rotation position of the detection object.

According to the present embodiment, as shown in FIG. 18B, in comparison to the first embodiment, the linearity of the signal outputted from the Hall IC 50 is improved.

According to the present embodiment, the first magnetic flux transmission unit 20 has the first thin board 21 with its both end portions, which are close to the second magnetic flux transmission unit 30, formed to extend along a free curve, or along a combination of multiple arcs. In other words, the first magnetic flux transmission unit 20 is formed to have a complex shape. Further, the second magnetic flux transmission unit 30 has the second thin board 31 with its both end portions, which are close to the first magnetic flux transmission unit 20, formed to extend along a free curve, or along a combination of multiple arcs, that is, the second magnetic flux transmission unit 30 is also formed to have a complex shape. However, by laminating/stacking the first thin boards 21 and the second thin boards 31, the first magnetic flux transmission unit 20 and the second magnetic flux transmission unit 30 are easily formed.

(Eleventh Embodiment)

The position sensing device in the eleventh embodiment of the present disclosure is described with reference to FIGS. 19A/B/C. The eleventh embodiment differs from the first embodiment in the shape of the first magnetic flux transmission unit and the second magnetic flux transmission unit, and in the use of a position sensing device.

According to the eleventh embodiment, a movable body 14 serving as a detection object is attached to a manual valve that changes shift positions of a gearbox of a vehicle, for example. The manual valve moves linearly along an axial direction on a straight line, and switches the shift positions of the gearbox. The mold part 9 is fixed onto a separate member that is close to but different from the manual valve. That is, the movable body 14 moves along a straight line relative to the mold part 9 that serves as a reference member.

According to the present embodiment, the position sensing device detects a position of the movable body 14 that moves relative to the mold part 9 along a straight line. Thereby, the position of the manual valve can be detected and the actual shift position of the gearbox can be detected. Thus, the position sensing device may be used as a stroke sensor (i.e., a linear movement sensor).

Figure 19A:
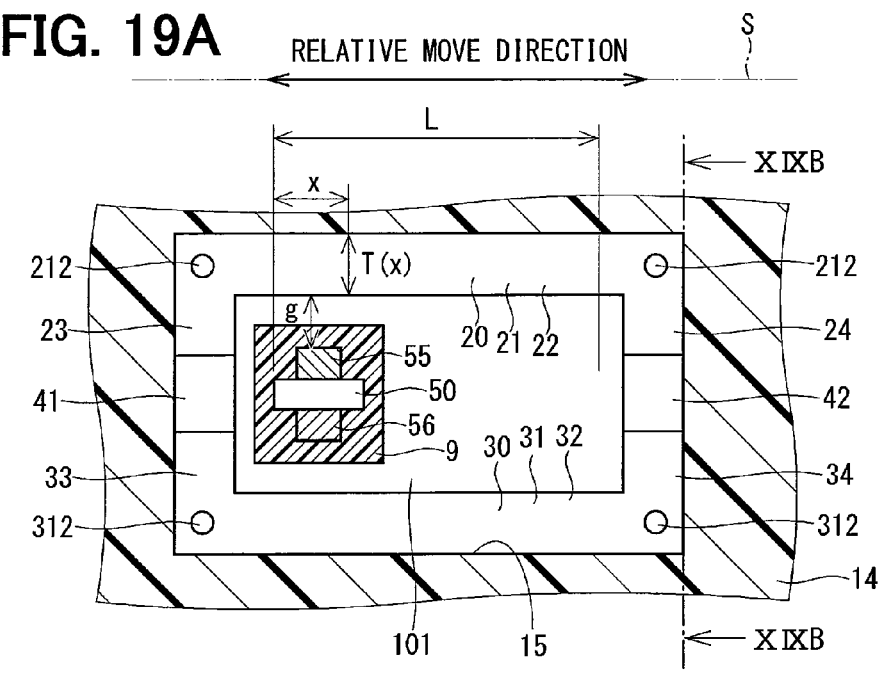
FIG. 19A is an illustration of a proximity of the magnetic circuit component of the position sensing device in an eleventh embodiment of the present disclosure.
Figure 19B:
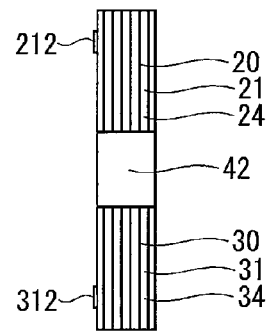
FIG. 19B is a sectional view of the component along a XIXB-XIXB line of FIG. 19A.
Figure 19C:
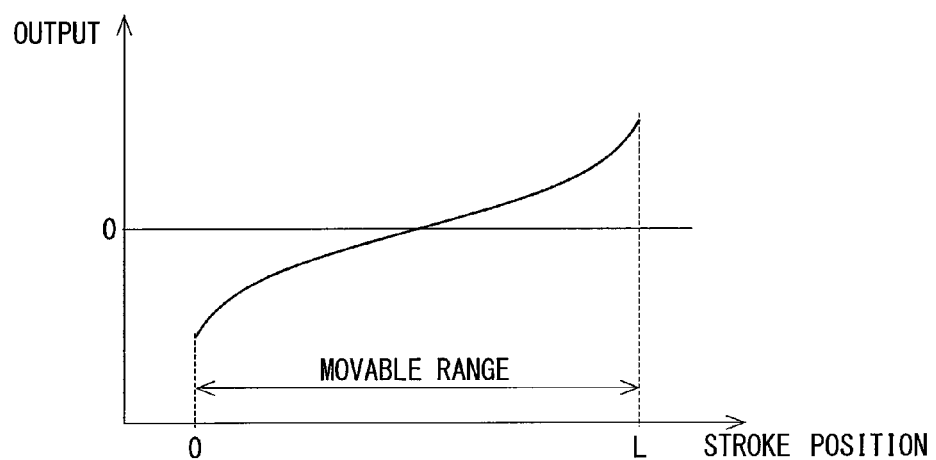
FIG. 19C is a graph of relationship between the output of the Hall IC of the position sensing device and a stroke position of the detection object.

As shown in FIG. 19A, in the present embodiment, the first magnetic flux transmission unit 20 is disposed in a hole 15 of a rectangular shape that is bored on the movable body 14. The first thin board 21 of the first magnetic flux transmission unit 20 has the main part 22 to extend in parallel with a virtual straight line S along a movement direction of the movable body 14. According to the present embodiment, at any position along the longitudinal direction (i.e., along the movement direction of the body 14), the main part 22 is configured to have the same width (i.e., the same lateral dimension). The extender part 23 extends from one end of the main part 22 substantially perpendicularly to the virtual straight line S. The extender part 24 extends in the same direction as the extender part 23 from the other end of the main part 22. The first magnetic flux transmission unit 20 has a longitudinal rectangular shape as a stack of multiple first thin boards 21.

The second magnetic flux transmission unit 30 is formed in the hole 15 of the movable body 14. The second thin board 31 of the second magnetic flux transmission unit 30 has the main part 32 to extend in parallel with the virtual straight line S, similar to the main part 22. According to the present embodiment, at any position along the longitudinal direction, the main part 32 is configured to have the same width (i.e., the same lateral dimension). The extender part 33 extends from one end of the main part 32 substantially perpendicularly to the virtual straight line S, and is positioned opposed to the extender part 23. The extender part 34 extends from the other end of the main part 32 in the same direction as the extender part 33.

As shown in FIG. 19A, the first magnetic flux transmission unit 20 and the second magnetic flux transmission unit 30 are disposed in the hole 15 of the movable body 14, so that the main part 22 of the first thin board 21 and the main part 32 of the second thin board 31 oppose each other in a direction perpendicular to the virtual straight line S. Thereby, the rectangular gap space 101 is defined at a position between a stack of the main part 22 of multiple first thin boards 21 and a stack of the main part 32 of multiple second thin boards 31. That is, the second magnetic flux transmission unit 30 is disposed on the movable body 14 to define the longitudinal (i.e., rectangular) gap space 101 at a position between itself and the first magnetic flux transmission units 20 by having the board thickness direction of the second thin board 31 aligned with the board thickness direction of the first thin board 21.

The configuration of the eleventh embodiment is the same as that of the first embodiment except for the above-described portion.

For example, assuming that the spill magnetic flux flows in a negative direction, i.e., from the second magnetic flux transmission unit 30 to the first magnetic flux transmission unit 20, when the Hall IC 50 moves in the gap space 101 from a proximity of the first magneto 41 to a proximity of the second magneto 42, the density of the magnetic flux monotonously increases from a negative value to a positive value, which means that a stroke position is uniquely identified by the magnetic flux density value, thereby allowing the Hall IC 50 to output a unique value according to the current stroke position.

(Twelfth Embodiment)

The position sensing device in the twelfth embodiment of the present disclosure is described with reference to FIGS. 20A/B/C. Compared to the eleventh embodiment, the twelfth embodiment differs in the shape of the first magnetic flux transmission unit and the second magnetic flux transmission unit, etc.

Figure 20A:
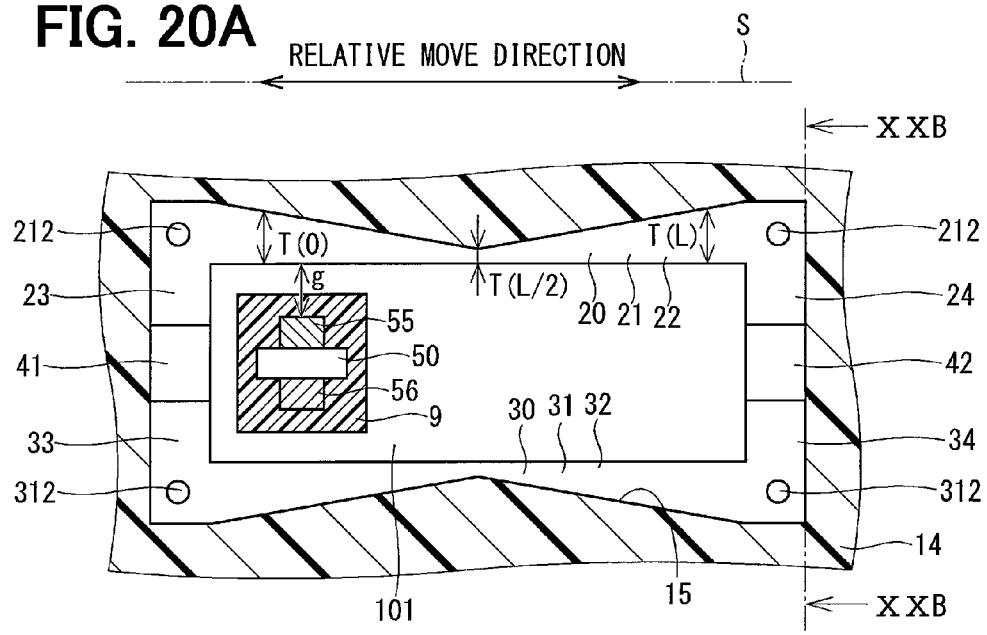
FIG. 20A is an illustration of a proximity of the magnetic circuit component of the position sensing device in a twelfth embodiment of the present disclosure.
Figure 20B:
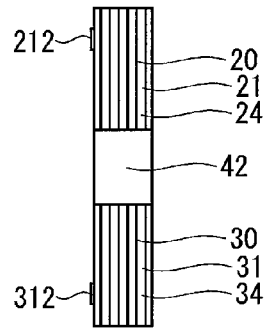
FIG. 20B is a sectional view of the component along a XXB-XXB line of FIG. 20A.

According to the twelfth embodiment, the main part 22 of the first thin board 21 has a gradually-increased width (i.e., a lateral dimension) as a longitudinal position of the main part 22 comes close to both longitudinal ends (see FIG. 20A). In such a case, a gap "g" between the main part 22 and the magnetic flux collecting part 55 has the same width at any position in the longitudinal direction of the gap space 101.

The main part 32 of the second thin board 31 has a gradually-increased width (i.e., a lateral dimension) as a longitudinal position of the main part 32 comes close to both longitudinal ends (see FIG. 20A). In such a case, a gap between the main part 32 and the magnetic flux collecting part 56 has the same width at any position in the longitudinal direction of the gap space 101.

Figure 20C:
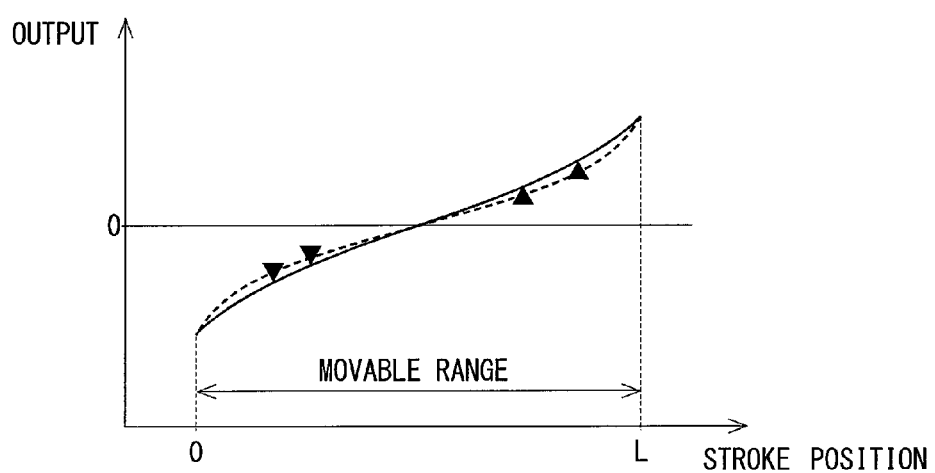
FIG. 20C is a graph of relationship between the output of the Hall IC of the position sensing device and the stroke position of the detection object.

According to the present embodiment, as shown in FIG. 20C, in comparison to the eleventh embodiment, a dynamic range of the magnetic flux density is improved, and the linearity of the signal outputted from the Hall IC 50 is also improved.

In the present embodiment, the first magnetic flux transmission unit 20 and the second magnetic flux transmission unit 30 respectively have a complex shape, i.e., a gradually-increased lateral width along the longitudinal direction. However, by laminating/stacking the first thin boards 21 and the second thin boards 31, the first magnetic flux transmission unit 20 and the second magnetic flux transmission unit 30 are easily formed.

(Thirteenth Embodiment)

The position sensing device in the thirteenth embodiment of the present disclosure is described with reference to FIGS. 21A/B/C. Compared to the eleventh embodiment, the thirteenth embodiment differs in the shape of the first magnetic flux transmission unit and the second magnetic flux transmission unit, etc.

Figure 21A:
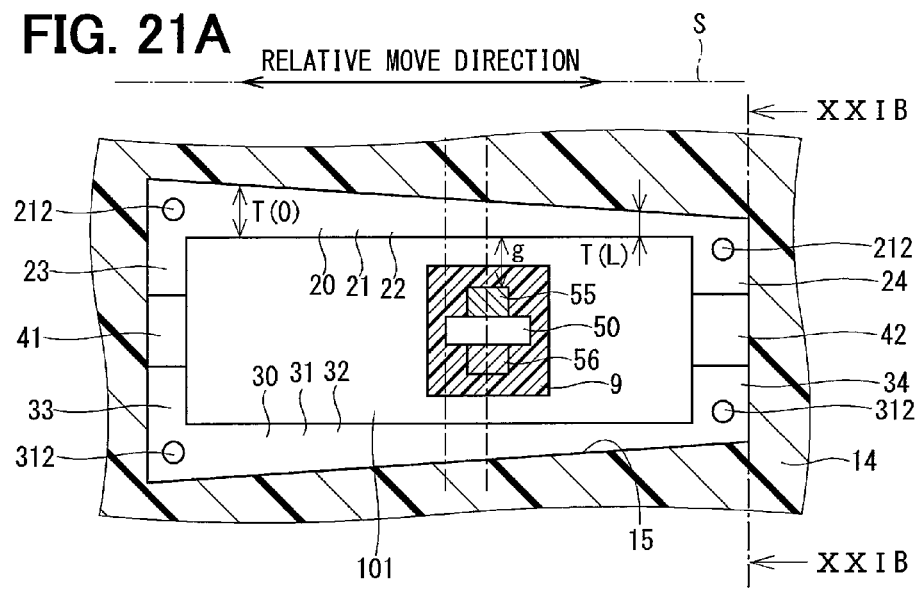
FIG. 21A is an illustration of a proximity of the magnetic circuit component of the position sensing device in a thirteenth embodiment of the present disclosure.
Figure 21B:
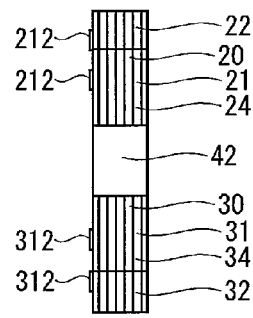
FIG. 21B is a sectional view of the component along a XXIB-XXIB line of FIG. 21A.

According to the thirteenth embodiment, the main part 22 of the first thin board 21 has a gradually-decreased width (i.e., a lateral dimension) along the longitudinal direction as a position of the main part 22 shifts from one longitudinal end to the other (see FIG. 21A). In such a case, the distance (g) between the main part 22 and the magnetic flux collecting part 55 has the same width at any position along the longitudinal direction of the gap space 101.

Further, the main part 32 of the second thin board 31 has a gradually-decreased width (i.e., a lateral dimension) along the longitudinal direction as a position of the main part 32 shifts from one longitudinal end to the other (see FIG. 21A). In such a case, the gap between the main part 32 and the magnetic flux collecting part 56 has the same width at any position along the longitudinal direction of the gap space 101.

Figure 21C:
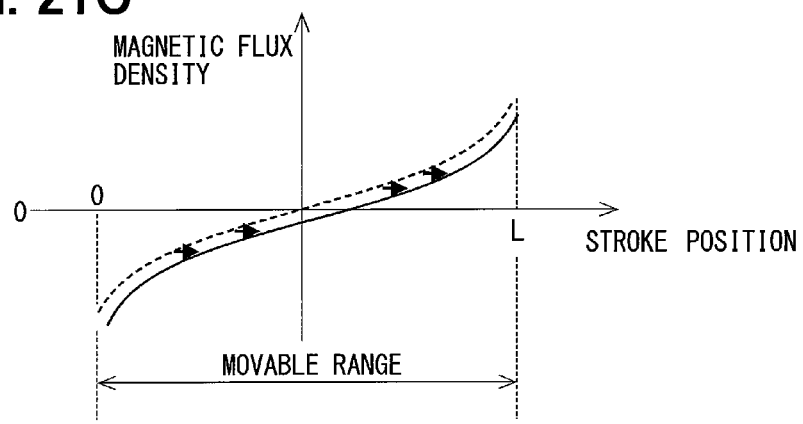
FIG. 21C is a graph of relationship between the output of the Hall IC of the position sensing device and the stroke position of the detection object.

According to the present embodiment, as shown in FIG. 21C, in comparison to the eleventh embodiment, "a position of the minimum absolute value of the magnetic flux density" (i.e., a zero density position) is set to any position from the longitudinal center of the gap space 101, i.e., from the center of the movable range of the movable body 14 to, e.g., a position close to a proximity of the second magnet 42. Therefore, when the position sensing device of the present embodiment is applied to the movable body 14 (i.e., a manual valve), which needs to have the highest position detection accuracy at a position other than the center of the movable range, "a position of the minimum absolute value of the magnetic flux density" (i.e., a zero density position) may be configured to be put at a position which needs to have the highest position detection accuracy.

Further, in the present embodiment, the first magnetic flux transmission unit 20 and the second magnetic flux transmission unit 30 respectively have a complex shape, i.e., a gradually-decreased width (i.e., a lateral dimension) along the longitudinal direction of the body. However, by simply laminating/stacking the first thin boards 21 and the second thin boards 31, the first magnetic flux transmission unit 20 and the second magnetic flux transmission unit 30 are easily formed.

(Other Embodiments)

In other embodiments of the present disclosure, the first thin board and the second thin board may be formed without the first concave region, the first convex region, the second concave region, and the second convex region. In such a case, the first magnetic flux transmission unit and the second magnetic flux transmission unit may be formed by using adhesives etc., for example, for the laminating/stacking and fixing of the first thin board and the second thin board.

Similarly, the first nonmagnetic part, the second nonmagnetic part, and the middle nonmagnetic part may be formed without a concave region and a convex region.

In other embodiments of the present disclosure, the first engagement part and the second engagement part may be formed on one side or on both sides of the first magnetic flux generation unit and the second magnetic flux generation unit, and the one side and the other side means the one and the other side of the generation unit in the longitudinal direction of the gap space.

In other embodiments of the present disclosure, the first nonmagnetic engagement part and the second nonmagnetic engagement part may be formed at any position.

In other embodiments of the present disclosure, the middle nonmagnetic engagement part may be formed at any position on one side in the longitudinal direction of the gap space relative to the first magnetic flux generation unit, and at any position on the other side in the longitudinal direction of the gap space relative to the second magnetic flux generation unit.

In other embodiments of the present disclosure, "a thin board formation process" and "a concavo-convex formation process" may be performed simultaneously. Further, after "a thin board formation process," "a laminating process" and "a concavo-convex formation process" may be performed.

In the above-mentioned embodiments, the first magnet as the first magnetic flux generation unit and the second magnet as the second magnetic flux generation unit are described as having the same size and the like. However, in other embodiments of the present disclosure, the second magnetic flux generation unit may be provided as a permanent magnet that has, in comparison to the first magnetic flux generation unit, at least one different attribute, such as the size/volume, kind, material composition, and the magnetized arrangement. Further, regardless of the width (i.e., a lateral dimension) of the gap space between the first and second magnetic flux transmission unit, the first/second magnetic flux generation unit may have an arbitrary size. Further, a polarity of the first/second magnet that is disposed at a position between end parts of the first/second magnetic flux transmission unit may be reversed relative to the setting in the embodiments described above.

In the above-mentioned embodiment, the first magnetic flux transmission unit, the second magnetic flux transmission unit, the first magnetic flux generation unit, and the second magnetic flux generation unit are described as disposed on the detection object, and the flux density detection unit is disposed on the reference member. On the other hand, in other embodiments of the present disclosure, the first magnetic flux transmission unit, the second magnetic flux transmission unit, the first magnetic flux generation unit, and the second magnetic flux generation unit may be disposed on the reference member, and the flux density detection unit may be disposed on the detection object.

In other embodiments of the present disclosure, the motor may have a speed reducer that reduces a rotation speed before transmitting a rotation to an output axis.

In other embodiments of the present disclosure, as long as there is no constitutional hindrance factor, each of the above-mentioned embodiments may be combined.

In other embodiments of the present disclosure, the actuator may be used, for example, as a wastegate valve operation device, as a variable vane control device of a variable capacity turbo charger, as a valve operation device of an exhaust gas throttle or an exhaust gas switch valve, or as a drive source of a valve operation device or the like of a variable air-intake mechanism.

Although the present disclosure has been fully described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. A position sensing device for detecting a position of a detection object that moves relative to a reference member, the position sensing device comprising:
   a first magnetic flux transmission unit having a long shape and provided on one of the reference member or the detection object, the first magnetic flux transmission unit being formed by stacking a plurality of first thin boards in a board thickness direction, the plurality of first thin boards being made from magnetic material;
   a second magnetic flux transmission unit having a long shape and provided on the one of the reference member or the detection object, the second magnetic flux transmission unit being formed by stacking a plurality of second thin boards in the board thickness direction, the plurality of second thin boards being made from magnetic material, the board thickness direction of each of the plurality of second thin boards being parallel with the board thickness direction of each of the plurality of first thin boards, and a gap space being defined between the first and second magnetic flux transmission units;
   a first magnetic flux generation unit disposed at a position between one end of the first magnetic flux transmission unit and one end of the second magnetic flux transmission unit;
   a second magnetic flux generation unit disposed at a position between other end of the first magnetic flux transmission unit and other end of the second magnetic flux transmission unit;
   a flux density detection unit outputting a signal according to a density of a magnetic flux passing therethrough;
   a first concave region receding from one surface of each of the plurality of first thin boards in the board thickness direction; and
   a first convex region protruding from other surface of each of the plurality of first thin boards in the board thickness direction, and having a corresponding shape and position with the first concave region,
   wherein
   the flux density detection unit is disposed on an other of the reference member or the detection object, and is movable within the gap space along a gap space longitudinal direction relative to the one of the reference member or the detection object,
   the first magnetic flux transmission unit is formed by engaging the first convex region with the first concave region of each of the plurality of first thin boards,
   a movable range within the gap space, in which the flux density detection unit moves relative to the first magnetic flux transmission unit and the second magnetic flux transmission unit, is defined as a detection range, and
   the first concave region and the first convex region are disposed outside of the detection range.

2. The position sensing device according to claim 1, further comprising:
   a second concave region receding from one surface of each of the plurality of second thin boards in the board thickness direction; and
   a second convex region protruding from an other surface of each of the plurality of second thin boards in the board thickness direction, and having a corresponding shape and position with the second concave region, wherein
   the second magnetic flux transmission unit is formed by engaging the second convex region with the second concave region of the plurality of second thin boards.

3. The position sensing device according to claim 2, wherein
   the second concave region and the second convex region are disposed outside of the detection range.

4. The position sensing device according to claim 1, further comprising:
   a first engagement part of the first magnetic flux transmission positioned (i) on one side or an other side of the first or second magnetic flux generation unit or (ii) on the one side and the other side of the first or second magnetic flux generation unit, and extending from at least one of the plurality of first thin boards to form a tip part of the first engagement part, wherein
   the tip part of the first engagement part is provided (i) on one side or an other side or (ii) on the one and the other side in the gap space longitudinal direction, engagingly holds the first or second magnetic flux generation unit, and regulates a movement of the first or second magnetic flux generation unit relative to the first or second magnetic flux transmission unit along the gap space longitudinal direction.

5. The position sensing device according to claim 1, further comprising:
   a second engagement part of the second magnetic flux transmission positioned (i) on one side or an other side of the first or second magnetic flux generation unit or (ii) on the one side and the other side of the first or second magnetic flux generation unit, and extending from at least one of the plurality of second thin boards to form a tip part of the second engagement part, wherein
   the tip part of the second engagement part is provided (i) on one side or other side or (ii) on one and other sides in the gap space longitudinal direction, engagingly holds the first or second magnetic flux generation unit, and regulates a movement of the first or second magnetic flux generation unit relative to the first or second magnetic flux transmission unit along the gap space longitudinal direction.

6. The position sensing device according to claim 1, further comprising:
   a first nonmagnetic part fixedly attached onto the first magnetic flux transmission unit (i) on one side or an other side or (ii) on the one side and the other side in the board thickness direction of the first magnetic flux transmission unit, wherein the first nonmagnetic part engagingly holds the first and second magnetic flux generation units and regulates a movement of the first and second magnetic flux generation units relative to the first magnetic flux transmission unit along the board thickness direction.

7. The position sensing device according to claim 6, further comprising:
a first nonmagnetic engagement part positioned (i) on the one side or the other side or (ii) on the one side and the other side of the first nonmagnetic part within the gap space longitudinal direction, wherein
the first nonmagnetic part engagingly holds the first or second magnetic flux generation unit and regulates a movement of the first or second magnetic flux generation unit relative to the first magnetic flux transmission unit along the gap space longitudinal direction.

8. The position sensing device according to claim 6, further comprising:
a second nonmagnetic part having a unified body with or a separate body from the first nonmagnetic part and fixedly attached onto the second magnetic flux transmission unit (i) on one side or an other side or (ii) on the one side and the other side in the board thickness direction of the second magnetic flux transmission unit, wherein
the second nonmagnetic part engagingly holds the first and second magnetic flux generation units and regulates a movement of the first and second magnetic flux generation units relative to the second magnetic flux transmission unit along the board thickness direction.

9. The position sensing device according to claim 6, further comprising:
a second nonmagnetic engagement part positioned (i) on the one side or the other side or (ii) on the one side and the other side of the second nonmagnetic part within the gap space longitudinal direction of the first or second magnetic flux generation unit, wherein
the second nonmagnetic part engagingly holds the first or second magnetic flux generation unit and regulates a movement of the first or second magnetic flux generation unit relative to the second magnetic flux transmission unit along the gap space longitudinal direction.

10. The position sensing device according to claim 1, further comprising:
a middle nonmagnetic part having middle nonmagnetic engagement parts in a board shape, disposed in between two of the plurality of first thin boards or between two of the plurality of second thin boards, and positioned (i) on one side or an other side or (ii) on the one side and the other side of the first or second magnetic flux generation unit within the gap space longitudinal direction, wherein
the middle nonmagnetic part engagingly holds the first or second magnetic flux generation unit and regulates a movement of the first or second magnetic flux generation unit relative to the first and second magnetic flux transmission units along the gap space longitudinal direction.

11. The position sensing device according to claim 1, wherein
the plurality of first thin boards of the first magnetic flux transmission unit have a free curve shape or a multiple arc combination shape on end portions that are close to the second magnetic flux transmission unit, and
the plurality of second thin boards of the second magnetic flux transmission unit have a free curve shape or a multiple arc combination shape on end portions that are close to the first magnetic flux transmission unit.

12. The position sensing device according to claim 1, wherein
the gap space has a width that varies along the gap space longitudinal direction.

13. The position sensing device according to claim 1, wherein
the plurality of first thin boards of the first magnetic flux transmission unit have a width that varies along the gap space longitudinal direction, and
the plurality of second thin boards of the second magnetic flux transmission unit have a width that varies along the gap space longitudinal direction.

14. A position sensing device for detecting a position of a detection object that moves relative to a reference member, the position sensing device comprising:
a first magnetic flux transmission unit having a long shape and provided on one of the reference member or the detection object, the first magnetic flux transmission unit being formed by stacking a plurality of first thin boards in a board thickness direction, the plurality of first thin boards being made from magnetic material;
a second magnetic flux transmission unit having a long shape and provided on the one of the reference member or the detection object, the second magnetic flux transmission unit being formed by stacking a plurality of second thin boards in the board thickness direction, the plurality of second thin boards being made from magnetic material, the board thickness direction of each of the plurality of second thin boards being parallel with the board thickness direction of each of the plurality of first thin boards, and a gap space being defined between the first and second magnetic flux transmission units;
a first magnetic flux generation unit disposed at a position between one end of the first magnetic flux transmission unit and one end of the second magnetic flux transmission unit;
a second magnetic flux generation unit disposed at a position between other end of the first magnetic flux transmission unit and other end of the second magnetic flux transmission unit;
a flux density detection unit outputting a signal according to a density of a magnetic flux passing therethrough
a second concave region receding from one surface of each of the plurality of second thin boards in the board thickness direction; and
a second convex region protruding from other surface of each of the plurality of second thin boards in the board thickness direction, and having a corresponding shape and position with the second concave region, wherein
the flux density detection unit is disposed on other of the reference member or the detection object, and is movable within the gap space along a gap space longitudinal direction relative to the one of the reference member or the detection object,
the second magnetic flux transmission unit is formed by engaging the second convex region with the second concave region of the plurality of second thin boards,
a movable range within the gap space, in which the flux density detection unit moves relative to the first magnetic flux transmission unit and the second magnetic flux transmission unit, is defined as a detection range, and
the second concave region and the second convex region are disposed outside of the detection range.

* * * * *